US007815505B2

(12) United States Patent
Wolf

(10) Patent No.: US 7,815,505 B2
(45) **Date of Patent: *Oct. 19, 2010**

(54) METHOD FOR REPRESENTING A GAME AS A UNIQUE NUMBER

(75) Inventor: Bryan D. Wolf, Reno, NV (US)

(73) Assignee: IGT, Reno, NV (US)

( * ) Notice: Subject to any disclaimer, the term of this patent is extended or adjusted under 35 U.S.C. 154(b) by 1040 days.

This patent is subject to a terminal disclaimer.

(21) Appl. No.: 11/147,595

(22) Filed: Jun. 7, 2005

(65) Prior Publication Data

US 2005/0233795 A1 Oct. 20, 2005

Related U.S. Application Data

(63) Continuation of application No. 10/006,496, filed on Dec. 5, 2001, now Pat. No. 6,923,719.

(51) Int. Cl.
*A63F 9/24* (2006.01)
*G06F 19/00* (2006.01)

(52) U.S. Cl. ............................ 463/22; 463/16; 463/17; 463/18; 463/19; 463/20

(58) Field of Classification Search ............ 463/17–20, 463/22
See application file for complete search history.

(56) References Cited

U.S. PATENT DOCUMENTS 5,377,973 A * 1/1995 Jones et al. .................. 463/12
5,707,286 A 1/1998 Carlson
5,967,893 A * 10/1999 Lawrence et al. ............ 463/10
5,988,638 A 11/1999 Rodesch et al.
6,003,867 A 12/1999 Rodesch et al.
6,099,408 A 8/2000 Schneier et al.
6,113,492 A * 9/2000 Walker et al. ................ 463/16

OTHER PUBLICATIONS

Australian Office Action mailed Jul. 4, 2006, from related Australian Application No. 2002313835, 2 pages.
Buckles, B.P. and Lybanon, M., "Algorithm 515, Generation of a Vector from the Lexicographical Index [G6]" ACM Transactions on Mathematical Software, vol. 3, No. 2, pp. 180-182, Jun. 1977.
U.S. Office Action dated Aug. 12, 2003 issued in U.S. Appl. No. 10/006,496.
U.S. Office Action dated Feb. 10, 2004 issued in U.S. Appl. No. 10/006,496.
U.S. Office Action dated Jul. 19, 2004 issued in U.S. Appl. No. 10/006,496.
Notice of Allowance dated Feb. 17, 2005 issued in U.S. Appl. No. 10/006,496.

* cited by examiner

*Primary Examiner*—Dmitry Suhol
*Assistant Examiner*—Werner Garner
(74) *Attorney, Agent, or Firm*—Weaver Austin Villeneuve & Sampson LLP

(57) ABSTRACT

Methods and apparatus for representing game arrangements by a single number, typically an integer, are described. These game arrangements can be applied to most any game including essentially all games played on gaming machines. Conversions can be made between symbolic representations of game arrangements and numeric representations of game arrangements. These conversions can be made using "ordering factors" such as game symbols and positions of such game symbols.

34 Claims, 12 Drawing Sheets

| | | | | |
|---|---|---|---|---|
| 2h | 3h | 4h | 5h | 6h |
| 2h | 3h | 4h | 5h | 7h |
| 2h | 3h | 4h | 5h | 8h |
| | | ⋮ | | |
| 2h | 3h | 4h | 5h | Ah |
| 2h | 3h | 4h | 6h | 7h |
| 2h | 3h | 4h | 6h | 8h |
| | | ⋮ | | |
| 3h | 4h | 5h | 6h | 7h |
| 3h | 4h | 5h | 6h | 8h |
| | | ⋮ | | |
| 9s | 10s | Js | Qs | Ks |
| 9s | 10s | Js | Qs | As |
| | | ⋮ | | |
| 10s | Js | Qs | Ks | As |

Figure 3

Convert KH, 7C, 4S, 8D, 3H to a number

Order the Cards! ⟶ 3H, KH, 8D, 7C, 4S

Start with # = 0

Position Q = 0

Symbol T= 1 (3H) 3H - - -

U = 0 (2H)

Compute # of ways to place 2H - - - - (choose (52-0-1, 5-0-2))

= 249,900

# = 0 + 249,900 = 249,900

Position Q = 1, $T_{current}$ = KH, $T_{Low}$ = 4H; 3H KH - - -

U = 2 (4H)

Compute # of ways to place 3H 4H - - -

= 18,424

# = 249,900 + 18,424 = 268,324

U = 3 (5H)

Compute # of ways to place (3H 5H - - -) = 17,296

# = 268,324 + 17,296 = 289,620

U = 4 (6H)

Compute # of ways to place (3H 6H - - -) = 16,215

# = # + 16,215 = 301,835

U = 5 (7H)

Compute # of ways to place (3H 7H - - -) = 15,180

# = # + 15,180 = 317,015

U = 6 (8H)

Compute # of ways to place (3H 8H - - -) = 14,190

# = # + 14,190 = 331,205

U = 7 (9H)

Compute # of ways to place (3H 9H - - -) = 13,244

# = # + 13,244 =344,449

U = 8 (10H)

Compute # of ways to place (3H 10H - - -) = 12,341

# = # + 12,341 = 356,796

Figure 7A

U = 9 (JH)

Compute # of ways to place (3H JH - - -) = 11,480

# = # +11,480 = 368,270

U = 10 (QH)

Compute # of ways to place (3H QH - - -) = 10,660

# = # + 10,660 = 378,930

U = 11 (KH) This our symbol T. Stop and go to the next position.

Position Q = 2, Symbol T = 19 (8D)

--- by placing this card

#s skipped over by (3H - - - -)

= ways to place (2H - - - - )

by placing this card # skipped over by (3H KH - - -)

= ways to place (3H 4H - - -)

\+ ways to place (3H 5H - - -)

\+ ways to place (3H 6H - - -)

\+ ways to place (3H 7H - - -)

\+ ways to place (3H 8H - - -)

\+ ways to place (3H 9H - - -)

\+ ways to place (3H 10H - - -)

\+ ways to place (3H QH - - -)

# skipped over by (3H KH 8D - -)

= ways to place (3H KH 8D - -)

\+ ways to place (3H KH AH - -)

\+ ways to place (3H KH 2D- -)

\+ ways to place (3H KH 3D - -)

\+ ways to place (3H KH 4D - -)

Figure 7B

| | Position Dependent | Position Independent |
| --- | --- | --- |
| With Replacement | exp (x, y)<br>$0 \le U \le T_{curr}$<br>$T_{low} = 0$ | C (x, y)<br>$T_{prev} \le U \le T_{curr}$<br>$T_{low} = T_{prev}$ |
| Without Replacement | P (x, y)<br>$0 \le U \le T_{curr}$<br>(excluding previously used values)<br>$T_{low} = 0$ | C (x, y)<br>$T_{prev} < U < T_{curr}$<br>$T_{low} = T_{prev} + 1$ |

Figure 8

METHOD FOR REPRESENTING A GAME AS A UNIQUE NUMBER

CROSS-REFERENCE TO RELATED APPLICATIONS

This application is a continuation of U.S. patent application Ser. No. 10/006,496, filed Dec. 5, 2001 now U.S. Pat. No. 6,923,719 and entitled "Method for Representing a Game As a Unique Number," which is incorporated by reference for all purposes.

BACKGROUND OF THE INVENTION

This invention pertains to game logic employed in or for gaming machines. More specifically, the invention pertains to techniques for representing arrangements of game symbols (e.g., poker cards, slot symbols, or keno tokens) as a function of position (e.g., card position in a poker hand, payline position on a slot machine, or position on a keno board).

Modern gaming machine technology has a need for generating and/or displaying each of the various possible "game arrangements" for all games that can be played on a gaming machine. These arrangements may be associated with a beginning game state, an ending game state, or an intermediate game state. In a slot machine, the beginning game state is the position of particular symbols on reels before the slot game is initiated. The ending game state is the final position of the symbols on the reels after the game play has concluded. For example, one game arrangement might be Bar, Lemon, Bar across a slot machine payline. In a poker game, the beginning game state may be a hand as dealt and an ending game state may be a hand after one or more cards have been discarded and redrawn.

It should be intuitively obvious that there are great numbers of possible game arrangements for even the simplest games. For example, a single deck 5-card draw poker game has over 2.5 million combinations of discrete poker hand card arrangements. These maybe viewed as varying from 2H (the 2 of Hearts), 3H, 4H, 5H, 6H on up to 10S (the 10 of Spades), JS, QS, KS, AS.

The computational logic provided with many gaming machines represents these game arrangements "as such." For example, each hand of a 5-card draw poker game will be represented as 5 separate symbols (e.g., 2H, 3H, 4H, 5H, 6H; 2H, 3H, 4H, 5H, 7H; 2H, 3H, 4H, 5H, 8H; etc.). Again, the symbols represent individual poker cards, slot machine symbols, keno tokens, checkers, etc. Not surprisingly, such representations can consume significant memory space. Typically, a single poker card will be represented by a single byte. (Technically only 6 bits are required, but for convenience most systems will use an entire byte). Hence, each poker hand may require 5 bytes of storage.

While the price of memory continues to drop, the need for more memory is rising at a faster pace. And for some aspects of gaming machine operation, specialized, expensive memory is required. For example, in order to save game "histories" in the event of a power failure of other malfunction, gaming machines include nonvolatile memory that saves snapshots of game play arrangements for a number of recent games. Obviously, it would be desirable to store greater numbers of game play arrangements in a given amount of nonvolatile memory, or any other form of memory for that matter.

Also, some operations used in gaming can require significant processing to evaluate various combinations of game arrangements. For example, the "autohold" decision employed in video poker must determine whether or not to "hold" when presented with a particular gaming arrangement (drawn poker hand). In video poker, a random number generator draws one hand for the machine and another hand for the player. Subsequently, the machine must determine whether or not it should hold its current hand as such. This is accomplished using the autohold table or associated decision logic programmed based on insights of experienced poker players. Autohold decisions are implemented by matching a currently drawn hand (e.g. 2H, 5D, KD, KC, 4S) against representations of poker hands provided by the game logic. Such comparisons are computationally expensive.

Determining payouts from slot machines based upon particular game arrangements may also require significant computational expense. In many cases, the game logic must compare a combination of symbols generated by random number generator against entries in a pay table to determine an amount of payout. Using a full representation of the arrangement of slot symbols "as such" (e.g. Bar, Bar, Bar on one payline and Cherry, Cherry, Cherry on a different payline) can be computationally expensive.

Gaming machines and games are becoming increasingly sophisticated and complex from a computational perspective. This results from more game options, more bonus games, more interactive features, 3-dimensional and other sophisticated graphics, etc. Therefore, machines that could efficiently represent game arrangements (e.g., poker hands, keno token positions, combinations of slot reel positions, etc.) would help reduce the computational demands on gaming machine processors and thereby improve performance.

SUMMARY OF THE INVENTION

This invention reduces game arrangements to a single number, typically an integer. Storing game arrangements as simple numbers frees up additional memory. Operating on game arrangements represented as numbers reduces the computational expense associated with those operations. The procedures of this invention are general in that they apply to most any game, including essentially any game played on gaming machines. In the embodiments described herein, "ordering factors" characterize various games of interest. Algorithms use these ordering factors to convert between symbolic representations of game arrangements and numeric representations of game arrangements. Ordering factors of principle interests include symbols and positions. Examples of symbols include a Queen of Hearts in a card deck, a keno token, a slot reel Cherry symbol, a checker, etc. Examples of positions include second slot reel-payline 3, $5^{th}$ card in a poker hand, $38^{th}$ position on a keno board, $21^{st}$ position on a checkerboard, etc.

One algorithm for converting a number representing a game arrangement into a symbolic representation of the game arrangement can be characterized by the following sequence: (1) receiving the number representing the game arrangement, (2) for a given position or symbol associated with the game arrangement, performing certain logical operations (employing a "ways to place" function) to identify a particular value for the given position or symbol, and (3) setting one or more symbols or positions of the symbolic representation. The logical operations in (2) may be the following: (a) setting the given position or symbol to a particular value of the position or symbol and calculating the number of ways to place the remaining free positions or symbols available beyond the given position or symbol, (b) using the calculated number of ways to place in a comparison with the received number representing the game arrangement, and (c) from said comparison, determining whether the particular value of the given position or symbol appears in the symbolic representation of the game arrangement.

In a specific approach, the algorithm may also involve the following operations: (i) repeating (a)-(c), with newly incremented particular values, until determining that the particular value of the given position or symbol does appear in the symbolic representation of the game arrangement; (ii) choosing a second given position or symbol associated with the game arrangement; and (iii) performing (a)-(c) for the second position or symbol associated with the game arrangement.

In one specific embodiment, the algorithm also involves subtracting the calculated number of ways to place from a current game arrangement number that is either (i) the number representing a game arrangement or (ii) a number that has been derived from the number representing a game arrangement. The number that has been derived from the number representing a game arrangement may be derived by subtracting previously calculated number of ways to place for other particular values of the given position or symbol.

The number of "ways to place" may be calculated with a permutation function, an exponential function, a choose function, or an application specific function coded by software, a look up table, etc., depending on how the particular game is classified. Game classifications may be based on at least one of the following: (i) whether the arrangement of symbols is position-dependent and (ii) whether a given symbol can appear more than once in the game arrangement. Examples of games that may be so classified include poker games, slot games, keno, and checker games. The game classification may also specify a range of particular values to iteratively consider at a given symbol or position in the algorithm.

In many cases, the symbolic arrangement derived as described above is subsequently displayed on a gaming machine—either during game play or outside of game play. In one example, method retrieves the number representing the game arrangement from a game history storage location on a gaming machine. In another example, method retrieves the number representing the game arrangement from a stored list or table of possible game arrangements when a player initiates a game on a gaming machine.

Another aspect of the invention pertains to methods of generating a number representing a game arrangement from a symbolic representation of the game arrangement. One such algorithm of this invention may be characterized by the following sequence: (1) for a given position or symbol associated with the game arrangement, (a) setting the given position or symbol to a particular value identified for said position or symbol in the symbolic representation of the game arrangement, (b) calculating a number of sequentially arranged game arrangements skipped over to reach a game arrangement having the particular value set at the given position or symbol, and (c) summing the number calculated with a current game arrangement number; (2) repeating (a), (b), and (c) for each given position or symbol available in game arrangements for the particular game; (3) returning the current game arrangement number as the number representing the game arrangement for the symbolic representation; and (4) using the number representing the game arrangement during game play on a gaming machine.

Generally, the algorithm begins by setting the current game arrangement number to zero.

The operation (b) may involve the following: for a series of position or symbol values less than the particular value, calculating a number of ways to place the remaining free positions or symbols available beyond the given position or symbol and summing the calculated numbers of ways to place to give the number of sequentially arranged game arrangements skipped over.

In one example, the method uses the number representing the game arrangement to determine which cards to hold in a poker hand. In another example, the method stores the number representing the game arrangement in a game history memory location.

Note that the above algorithms may be executed on a gaming machine or another computing machine affiliated with a gaming machine, such as a server for games in a casino or other establishment. The algorithms may also be executed independently of the gaming machine, during game development for example.

This invention also pertains to machine-readable media (e.g., volatile or nonvolatile memory) on which is provided program instructions for performing the methods of this invention. The invention also pertains to machine-readable media on which is provided arrangements of data or data structures associated with this invention.

The remainder of the specification will set forth-additional details and advantages of the present invention.

BRIEF DESCRIPTION OF THE DRAWINGS

FIG. 3 depicts a sequential arrangement of poker hands (game arrangements) ordered in a manner in which position is the major order.

FIGS. 7A and 7B present a series of calculations performed using the algorithm of FIG. 6 when applied to a specific example.

FIG. 8 is a chart depicting how certain aspects of the algorithms depicted in FIGS. 6 and 9 vary with different classes of game.

DETAILED DESCRIPTION OF THE PREFERRED EMBODIMENTS

Introduction

Figure 1:
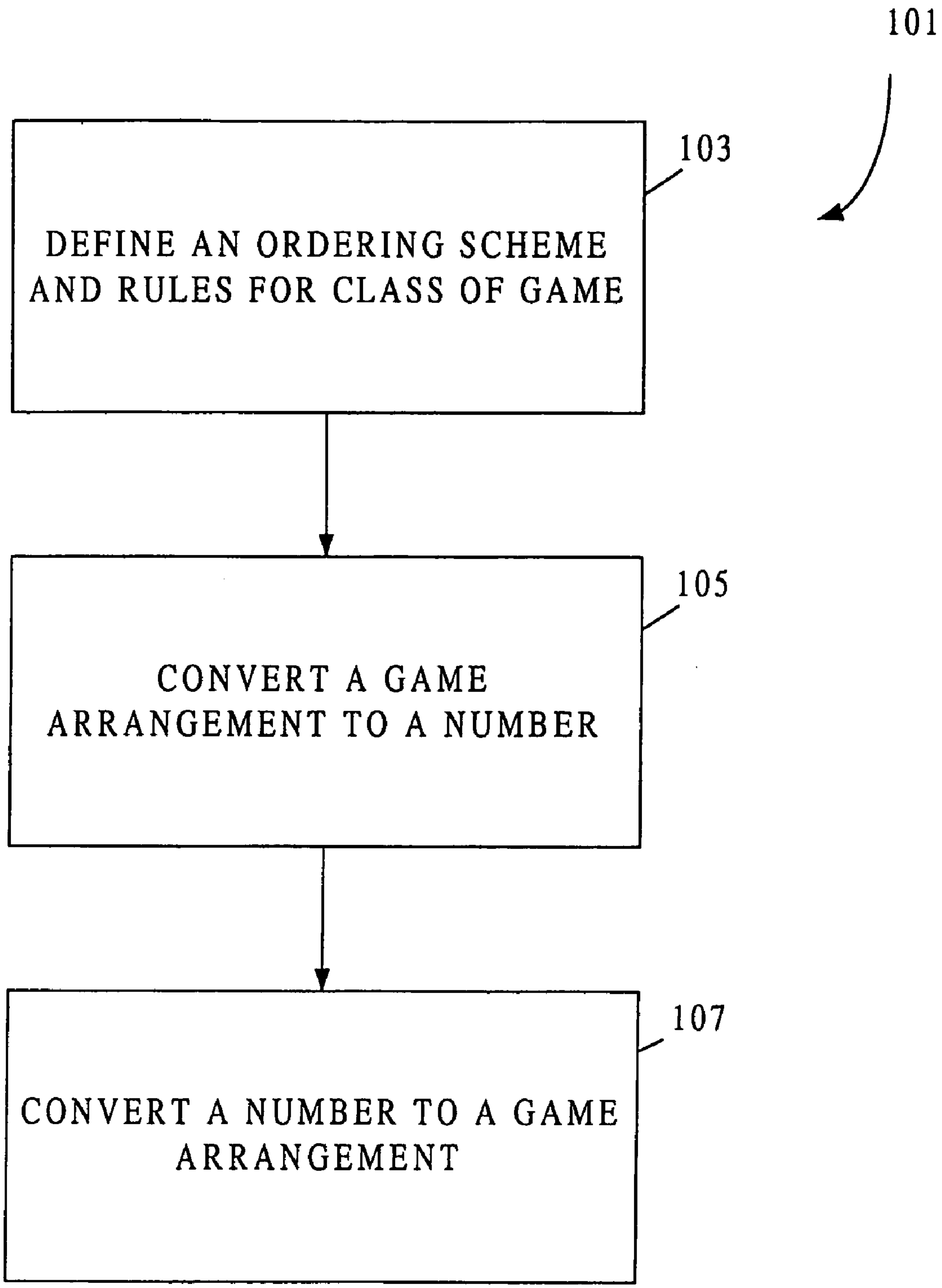
FIG. 1 presents a generalized list of the various operations that may be performed in accordance with this invention.

As indicated, this invention pertains to representations of game arrangements as specific numbers, typically integers. One important concept associated with this invention is that of a "game arrangement." Most games have many different game arrangements. As mentioned above, 5-card draw poker has well over 2 million separate game arrangements (poker hands). Each game arrangement is uniquely defined in terms of two or more ordering factors. These are the parameters that provide variability in the game. Examples of typical ordering factors that uniquely define game arrangements include symbols, positions, and orientations.

Most any game played on a gaming machine can have its game arrangements uniquely defined by specifying a combination of symbols and positions, as ordering parameters. Each game has multiple positions, each of which may be associated with a particular symbol. For example, each position on a keno board may have one of two "symbols." These are "token present" and "token absent." A checkers game has 32 available positions (black or white squares on the board) and 5 possible symbols: Black Pawn, Red Pawn, Black King, Red King, and unoccupied. A slot game has various positions defined as a combination of slot reel and payline. Understand that a single slot reel may display multiple symbols, some or all of which are associated with paylines. The slot game symbols include the symbols displayed on the slot reels themselves, e.g., Diamonds, bars, cherries, lemons, and various other thematic or entertainment symbols. And, of course, poker and other card games have positions defined by card position in a hand. For multi-play poker games, the position may be more precisely defined by a particular hand within a group of 2 or more hands displayed on the screen. The symbols associated with a card game are simply the cards themselves; 2 of Hearts, Ace of Spades, etc.

Central to this invention is the ability to unambiguously convert between a specific gaming arrangement and a unique number. The reverse function is also important: converting from a unique number to a particular game arrangement. Various algorithms and functions may be employed for this purpose. Some of these will be described below. In a preferred embodiment, the functions or algorithms are general, in that they apply to multiple different games. In further preferred embodiments, the algorithms or functions will be reversible in that an "inverse" of the function can be employed to undo a conversion.

Various applications of this invention have been developed and contemplated. Some of these will now be described.

This invention is useful for testing every possible game outcome (or other game arrangement) by incrementing a number and testing the game arrangement represented by that number. One example is testing the autohold functionality of a poker game by testing every possible hand. Another example is evaluating a game pay table by evaluating every possible game outcome. By converting each game outcome (associated with a particular game arrangement) to a number in a fixed range, one can guarantee that each game outcome is tested exactly once. For poker, a similar application is addressed in U.S. Pat. No. 5,967,893, which is incorporated herein by reference for all purposes.

The invention may also be used to generate paytable specifications when a game is selected for play on a particular gaming machine. Note that many video gaming machines can present more than one game. Rather than store a paytable for each game, this invention allows paytable specifications to be generated "on the fly," after a user or casino identifies the particular game that is to be presented. In one case, the invention allows conversion between paytable specifications and actual game outcomes. In a specific example, the paytable specifications are for scatter symbol plays on a slot machine.

Storing the game data with the least amount of memory is another benefit of this invention. As indicated, gaming machines typically store information about recently played games or game sequences in non-volatile memory. Then, if a gaming machine fails for any reason, disputes between casinos and patrons and can be resolved by replaying the game histories in recorded in the nonvolatile memory or other storage medium in the gaming machine or casino. When non-volatile memory used for this purpose, memory is expensive and limited. With this invention, a game history can be stored as a number, which reduces the required logic in generating, storing and reproducing game history records. And, of course, it reduces the required storage area.

This invention can be also used to store some data about each possible game arrangement. For example, a poker auto-hold table can be implemented as a table of 5-bit entries, with one entry for each possible poker hand, and each bit representing one of the cards in the associated poker hand. A value of zero could mean hold and a value of one could mean discard. The entry position of the table itself is simply the number representation of the poker hand (game arrangement). Given a poker hand, to tell what cards to hold, the game logic simply has to convert the game to a number (assuming that it is not already represented as a number), look up the autohold entry at the position of that number and apply it to the game. Likewise, a table could store other data such as the number of possible jumps in a checker game, the best strategies and expected yield of a blackjack game, etc.

Note that when game arrangement numbers are employed to access a table, such as a poker autohold table, the actual value of the game arrangement number need not be stored in the table. After the number is computed, it is used as an address for accessing the table. The table itself essentially has only a single entry, the autohold instructions, etc.

The invention may also assist in selecting game arrangements when a player initiates a game play. This can be achieved in various ways. Two of them follow. Both involve weighted probabilities for selecting certain game arrangements to present to a player. This may be desirable when particular starting arrangements are more valuable than other starting arrangements. For example, some starting arrangements of checker pieces are particularly complicated or difficult for normal players. In selecting starting arrangements of checkers for new games, the gaming machine should preferentially select those arrangements that are most appealing to players.

In a first approach, let sets of numbers that represent game arrangements be grouped together, such that the probability of getting two game arrangements in the same group is equal. One group is chosen, perhaps with a weighted probability. Once that group is chosen, a number is randomly drawn from that group. The number is converted to a game, using the methods described herein, and that game is presented to the player. Note that there are many methods of efficiently storing groups of numbers, such as storing the range of a set of numbers, compressing data, etc.

In an alternative approach, one may also create a table with one entry for each game arrangement. The table contains a single value, which is the ending random number generator range for that arrangement and where one index's value minus the previous index's value represents the weight for that outcome. The game logic then chooses a random number out of the entire range of zero to the value of the last entry. It then finds the first entry with a value greater than the random number chosen. There are many methods of doing this. One preferred approach involves a binary search. Finally, the game logic converts the index of that entry to a game arrangement and presents the player with that game.

As mentioned, this invention also provides general techniques for interconverting between game arrangements and unambiguous numbers representing those game arrangements. The invention also provides methods of generating algorithms and/or functions for developing suitable algorithms for the interconversion. This aspect of the invention is general and applies across multiple, if not all, types of games. FIG. 1 depicts a very general process employed to generate and use an algorithm for interconverting between game arrangements and unique numbers. As depicted, the process 101 begins by defining an "ordering scheme." See 103. This operation identifies the relevant positions and symbols employed in the game. It also develops an order or sequence of all the various game arrangements defined uniquely by the position and symbol combinations. Finally, it specifies certain rules for the interconversion algorithm. Which rules are chosen depends upon the class of game under consideration. For example, one set of rules applies for games that are order independent with replacement allowed and another set of rules for games that are order dependent without allowing replacement.

With the ordering scheme in hand, the game logic can actually convert between an arbitrary game arrangement and a corresponding unique number. See 105. Exemplary algorithms for accomplishing this will be described below. The game logic may also convert between a unique number and an associated game arrangement. See 107. Exemplary algorithms for this operation will also be described below.

Note that FIG. 1 depicts various aspects or operations of the invention. It does not necessarily represent a common process flow employed with games. Operation 103 may be conducted by a human or by a machine, typically a computing apparatus separate from the gaming machine itself. Operations 105 and 107, however, are typically implemented by gaming machine logic. Although they may also be implemented in a gaming logic testing system for testing certain logic such as autohold tables.

Figure 2:
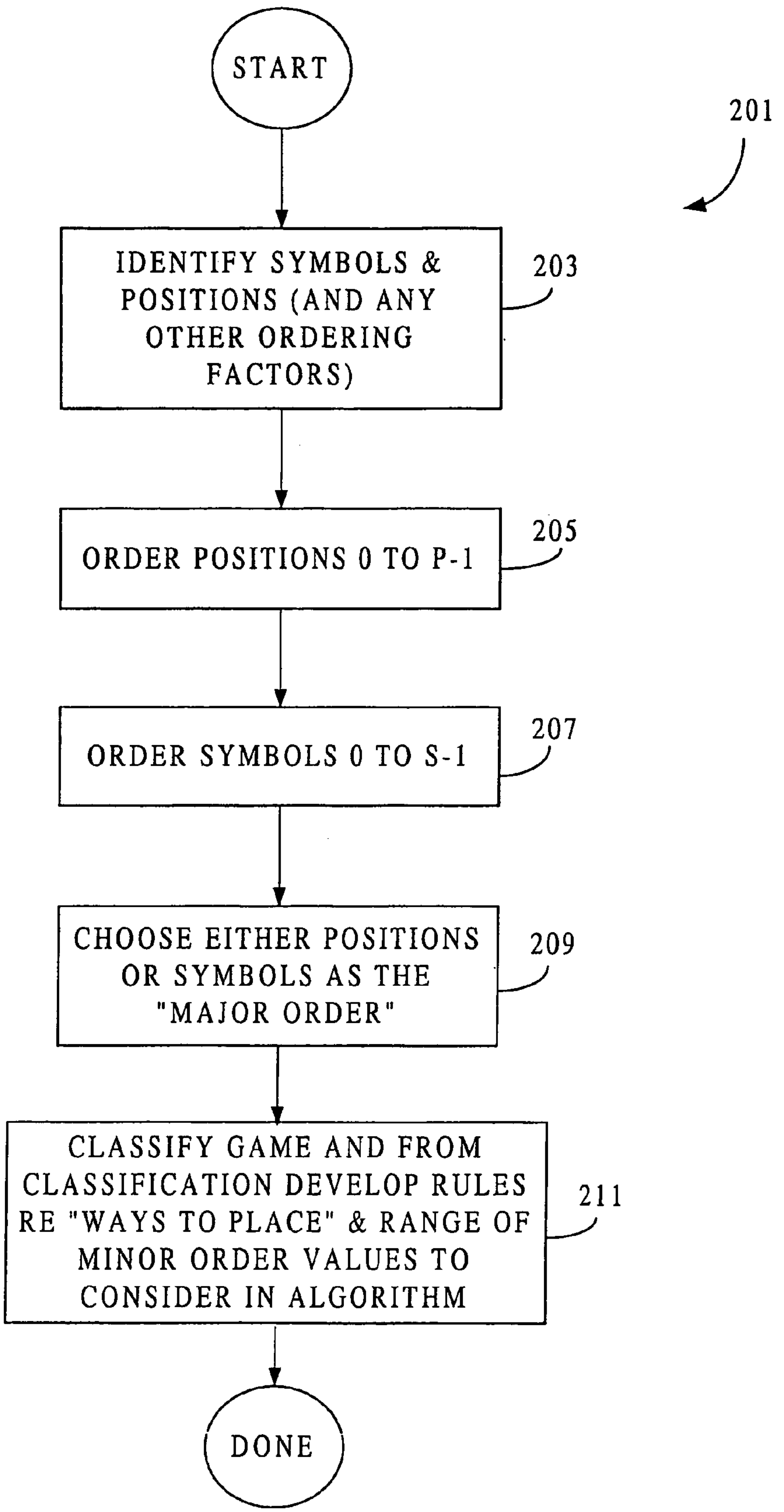
FIG. 2 is a process flow diagram depicting a series of operations that may be performed initially in generating or using an algorithm to interconvert between a particular game arrangement number and a symbolic representation of the game arrangement.

FIG. 2 depicts a process flow for developing an ordering scheme and associated rules to be used in generating an interconversion function. As shown, a process 201 for defining an ordering scheme begins at 203 with identification of symbols and positions (and any other ordering factors relevant to the game). As indicated above, a poker game that deals 5 cards in one hand can be expressed as filling five positions, with five of 52 different symbols. A keno game can be expressed as placing 20 spots or tokens (symbols) on an 80-spot card (80 positions). A slot game can be expressed as placing one reel symbol in each reel position. A checkers game can be expressed as placing up to 12 pieces (symbols) of each color into 32 positions on a checkers board.

After the symbols and positions (and any other ordering factors) are identified at 203, the process next involves ordering the positions. See 205. Preferably, for a game having P positions, those positions are ordered from 0 to P−1. Thus, the 5-card poker hand would have positions 0 through 4. Next in process flow 201, S different symbols are ordered from 0 to S−1. Obviously, the sequence of operations 205 and 207 can be reversed.

Next, at 209, the individual or machine developing the ordering scheme will choose either the positions or the symbols to be the "major order." The other becomes the minor order. Given a major and minor order, the set of all different game arrangements can be ordered. If, for example, two game arrangements are identical except that their symbols differ in one position, the game with the lesser-valued symbol may occur earlier in the game order.

Finally, at 211, process 201 classifies the game based upon parameters such as whether or not the game is position independent and whether or not the game allows replacement symbols (as in the case of a multi-deck poker game for example). From this classification, a particular "WaysToPlace" function is specified and a range of minor order values to consider at each value of major order is specified. These operations will be described in more detail below in a discussion of the game arrangement to number conversion algorithm.

FIG. 3 depicts a sequence of game arrangements for a 5-card poker hand. The sequence employs position as the major order and symbol as the minor order. The symbols are arranged starting with 2H being the lowest value, 3H being the next lowest value, and moving incrementally up to AH. Then, Diamonds are considered in the identical order followed by Clubs and then Spades.

Figure 4:
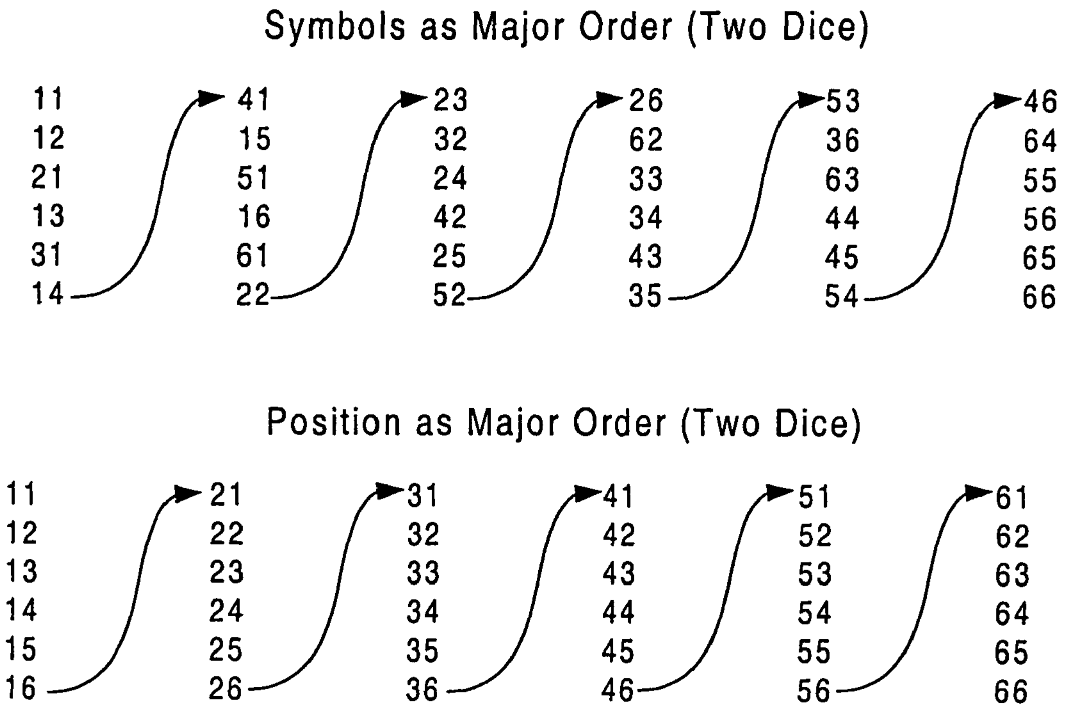
FIG. 4 depicts a sequential listing of game arrangements in which symbols are the major order.

FIG. 4 depicts a sequence of game arrangements in which symbols are the major order and positions are the minor order. For this figure, consider a two-die game. The numbers (symbols) presented by a roll of the dice are the major order. Which dice actually presented those symbols (positions) is the minor order.

Since symbol is the major order, all arrangements with symbol "1" occur first, followed by arrangements with symbol 2, etc. Since position is the minor order (but it is still an order so it affects the sequence of arrangements in a list), a "1" in the first position will occur in list before a "1" in the second position. In other words, 1-2 occurs before 2-1.

By contrast, if position were the major order and symbol were the minor order, the sequence of the list would vary markedly. This is shown for comparison in FIG. 4.

Conversion Algorithms (Game to Number)

Regarding conversion of a game arrangement to an unambiguous number, an example of detailed algorithm will he discussed below. This algorithm assumes that position is the major order and symbol is the minor order. The principles described in this example can be applied for other sequences in which symbol is the major order.

Generally, the conversion algorithm employs a position-by-position analysis (assuming that position is the major order). For each position, the algorithm determines the number of other game arrangements that have been "skipped over" to reach the symbol of the current position. Remember that all game arrangements have been positioned in a particular order with respect to one another, given the position and symbol orders defined above. Within that order there are a number of "earlier" game arrangements in the overall sequence.

To calculate a "skipped over" count associated with a given symbol/position combination, the logic calculates a "Ways ToPlace" value for each "earlier" symbol value available at the current position. Basically, the WaysToPlace functions specifies the number of WaysToPlace symbols in the other positions not yet considered in the algorithm, while setting the previously considered position and current position with the specified symbols of the current game arrangement.

The number of earlier symbols available for consideration by the WaysToPlace function depends on the classification of the game. As explained below, the function varies depending upon whether or not the game is position dependent, whether or not replacement symbols are available, and other factors. For games where replacement is possible, previously considered lower symbols must be considered again because these earlier symbols (associated with an earlier position) are not necessarily excluded from consideration. In multi-deck poker, it is possible that a 3 of Hearts will be drawn at the second position, even if it was earlier drawn for the first position. This is not possible for single deck poker. Thus, for single deck poker fewer earlier symbols must be considered.

Figure 5:
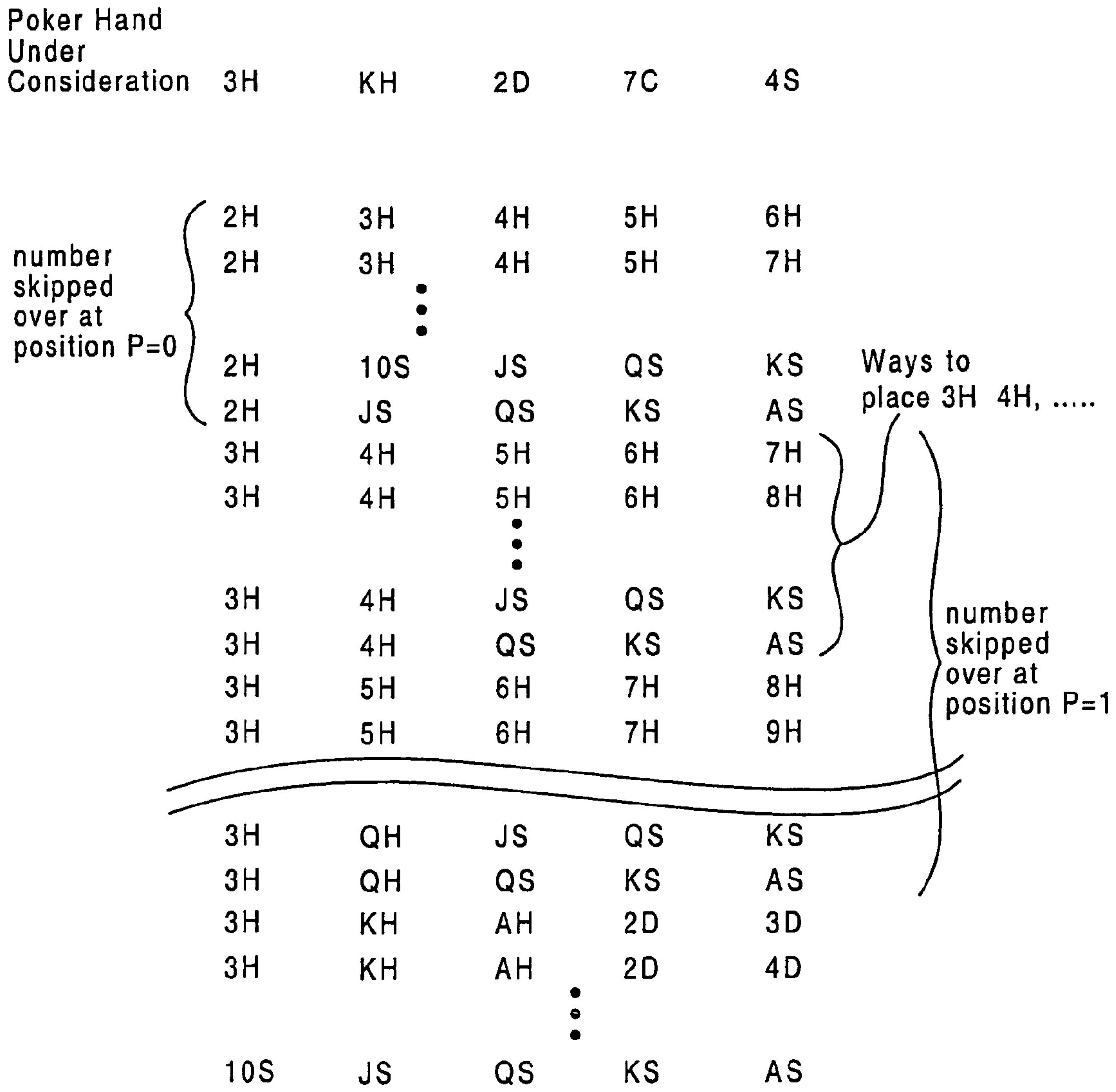
FIG. 5 graphically depicts how an algorithm of this invention may sequentially traverse a number of game arrangements to arrive at a unique number associated with a specific game arrangement.

The concepts of WaysToPlace and number of game arrangements skipped over are depicted in FIG. 5. In FIG. 5, all the possible game arrangements associated with a 5-card poker hand are depicted. The poker hands are arranged with position being the major order and symbol being the minor order. As with FIG. 2, the symbols in the left most position are fixed first and the symbols in the right most positions are fixed last. The symbol order varies from 2 through Ace, with Hearts being considered first, Diamonds being considered second, Clubs being considered third and Spades being considered last. Thus, the first (top most) game arrangement (poker hand) is 2 of Hearts, 3 of Hearts, 4 of Hearts, 5 of Hearts, and 6 of Hearts. The last game arrangement would be 10 of Spades, Jack of Spades, Queen of Spades, King of Spades, and Ace of Spades.

Note that in the depicted poker hands, the symbols are arranged in a left most to right most position from lowest symbol number to highest symbol number. This arrangement is appropriate in "order-independent" games such as most poker games. In such games, the positional order of the various symbols does not matter. In other words, a poker hand organized as 7 of Clubs, 4 of Spades, 3 of Hearts, 2 of Diamonds, and King of Hearts is equivalent to a poker hand organized as 3 of Hearts, King of Hearts, 2 of Diamonds, 7 of Clubs, and 4 of Spades.

Suppose that the poker hand at issue had 3 of Hearts, Kings of Hearts, 2 of Diamond, 7 of Clubs, and 4 of Spades, as depicted at the top of FIG. 5. In accordance with the algorithm described herein, the unique number associated with this game arrangement is determined by conceptually jumping through the sequence of game arrangements (starting with 2 of Hearts, 3 of Hearts, 4 of Hearts, 5 of Hearts, and 6 of Hearts) to the sequential position occupied by 3 of Hearts, King of Hearts, 2 of Diamonds, 7 of Clubs, and 4 of Spades.

To rapidly accomplish this traversal, the logic determines the number of game arrangements "skipped over" to reach the symbol at the first position. Then, it determines the number of game arrangements skipped over to reach the symbol at the second position, starting with the first game arrangement associated with the symbol at the first position. The process continues for each additional position in the game arrangement. At any given position, the number of game arrangements that are skipped over is equal to the number of game arrangements that have a lesser value available symbol in the current position.

This is illustrated in FIG. 5 where the left most position (P=0) for the poker hand under consideration contains a 3 of Hearts. To determine the number of game arrangements skipped over to reach the 3 of Hearts in position P=0, the logic calculates how many different game arrangements (poker hands) have the 2 of Hearts at position P=0. As explained below a "choose" function is used for this purpose. In FIG. 5, this traversal is represented by the bracket labeled "number skipped over at position P=0."

After the number of game arrangements skipped over to reach the symbol at position P=0 is determined, that number is saved and subsequently summed with later calculated numbers of game arrangements skipped over to reach each of the symbols occupying the other game positions. As mentioned, the number of skipped over game arrangements is determined first for position P=0, then for position P=1, then for position P=2, then for position P=3, and finally for position P=4.

The case in which a 3 of Hearts occupies P=0 is a rather simple case for calculating the number of game arrangements skipped over. The more complicated situation is depicted for position P=1, where the symbol is the King of Hearts. In order to determine the number of game arrangements skipped over to reach the first game arrangement having a 3 of Hearts in position P=0 and a King of Hearts in position P=1, the logic must evaluate a "WaysToPlace" function repeatedly. The WaysToPlace function is evaluated for each lesser symbol below King of Hearts, but not including the 2 of Hearts or the 3 of Hearts. Note that all hands including a 2 of Hearts were already considered in determining the number of arrangements skipped over to reach the 3 of Hearts at position P=0. Similarly, the 3 of Hearts has been set for position P=0. Therefore the 3 of Hearts is not available for use in any of the other positions, including the second position. So, the number of skipped over arrangements to reach the King of Hearts at position P=1 is the number of arrangements spanning between the poker hand 3H, 4H, 5H, 6H, and 7H to the poker hand 3H, KH, AH, 2D, and 3D. In FIG. 5, this traversal is represented by the bracket labeled "number skipped over at position P=1."

To determine the number of game arrangements skipped over at position P=1, one may evaluate a WaysToPlace function for each successive symbol encountered in the second position. Thus, the WaysToPlace function is evaluated for the following symbols in the second position: 4 of Hearts, 5 of Hearts, 6 of Hearts, 7 of Hearts, 8 of Hearts, 9 of Hearts, 10 of Hearts, Jack of Hearts, and Queen of Hearts. For each of these symbols, a choose function is evaluated. The sum of the various choose function values is the number skipped over at position P=1. FIG. 5 depicts the range of game arrangements that give the value of the WaysToPlace function for the 3 of Hearts in the first position and the 4 of Hearts in the second position. Similarly, the WaysToPlace function must be evaluated for arrangements in which the first position is occupied by the 3 of Hearts and the second position is occupied by the 5 of Hearts, and so on. In essence, the WaysToPlace function determines the number of different WaysToPlace remaining cards when the first 2 positions (P=0 and P=1) are occupied by specified cards (symbols).

Note that the example of FIG. 5 was designed to show conceptually how to determine the number associated with a game in which replacement is not possible (the 3 of Hearts can appear only once) and position of the symbols does not matter. Other games are either positioned dependent or allow replacement. A general algorithm of this invention accounts for any of four or more possible classes of games. That algorithm will now be described with reference to FIG. 6.

Figure 6:
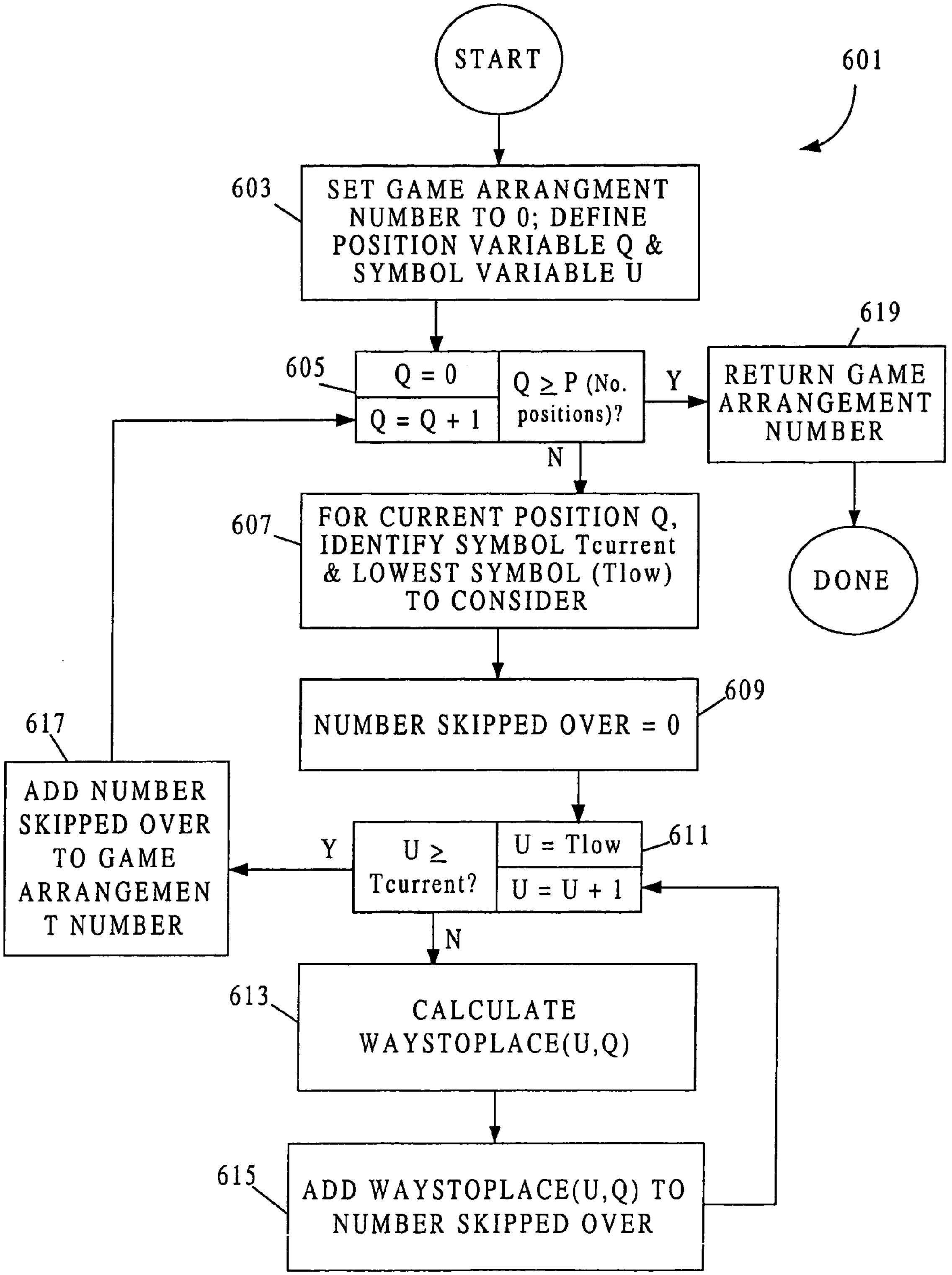
FIG. 6 is a process flow diagram depicting an exemplary algorithm for converting a symbolic representation of a game arrangement to a corresponding number representing the game arrangement.

As depicted in FIG. 6, a process 601 begins at 603 where the game arrangement numeric value is initialized to a value of 0. Also at this point, the position variable Q and the symbol variable U are defined. As indicated above, the process considers each position Q in order, where Q ranges from position 0 to position P−1. (Note that the game in question has P different positions.) This is represented by an iterative loop control 605, which initializes the value of Q to 0 on the first pass. Subsequently, it increments the value of Q by 1 on each pass. Iterative loop control 605 also determines whether the current value of Q is greater than or equal to the value of P. If not, process control moves to an operation 607.

For each position Q, the algorithm computes the number of game arrangements that are skipped over in the ordered set of game arrangements by selecting the symbol that occurs in position Q of the game being converted. The symbol at position Q of the game arrangement being converted is given the designation "Tcurrent." To compute the number of game arrangements skipped over at a given position Q and a given symbol Tcurrent, one must consider a number of other symbols at position Q. A symbol variable U was defined for the purpose of indexing the individual symbol values that must be considered at a given position. The range of symbol values to be considered at a given position varies depending upon the class of game considered. Note that where the game is order-independent, as in poker or keno, U must be greater than the "previous symbol"; i.e., the symbol associated with the previous position. Thus, in order-independent games, the value of U ranges from Tprevious+1 to Tcurrent−1. But if selection with replacement is allowed (e.g., multi-deck poker games), U must be greater than or equal to the previous symbol. In other words, U ranges from the value of Tprevious up to the value of Tcurrent−1. In the case where the game is order dependent, the value of U ranges from 0 on up to Tcurrent−1. Other variations may exist, as dictated by the game under consideration.

Returning to FIG. 6, block 607 indicates that for the current position Q, the logic identifies the symbol Tcurrent (the symbol at current position Q for the game arrangement under consideration) and the lowest symbol to consider in computing the number of game arrangements skipped over. As indicated in the previous paragraph, the value of Tlow will typically be 0, Tprevious, or Tprevious+1.

After the range of symbols to be considered at position Q has been determined at 607, the process sets the number of game arrangements skipped over to the value 0 as indicated at block 609. Note that for each position, the number of game arrangements skipped over is recalculated. Note that the number of skipped over game arrangements is calculated for each position and then summed over all positions to give the desired game arrangement number.

The number of game arrangements skipped over for current position Q is accomplished with a looping operation in which the symbol index U is incremented from Tlow through Tcurrent−1. This loop is controlled as indicated by an iterative loop control 611 in which the value of U is initialized to the value Tlow. At the beginning of each loop a comparison is performed in which the current value of U is compared against Tcurrent. As long as the value of U is less than Tcurrent the loop continues. As depicted in FIG. 6, the first operation within the loop calculates the values of a WaysToPlace function that has the variables U and Q as arguments. See block 613. The WaysToPlace function computes the number of game arrangements that have positions 0 to Q−1 filled the same way as the game arrangement under consideration, but have the current value of symbol U in position Q. Positions Q+1 through P−1 may have any arrangement of symbols that the game permits (based on remaining available symbols). These various arrangements collectively provide the value for the WaysToPlace function. As described below, examples of the WaysToPlace function include choose(f(U), f'(Q)), perm (f(U), f'(Q)), and exp(f(U), f'(Q)).

After the WaysToPlace (U, Q) has been calculated for the current value of U, the process adds the WaysToPlace value to the current value of the number of game arrangements skipped over. On the first iteration of the loop, this sum is simply the value of the WaysToPlace function because the numbers skipped over was previously 0. In subsequent loops the value of the number skipped over increases as a summation.

After recalculating the numbers skipped over at block 615, process control returns to iterative loop control 611 where the value of the symbol variable U is incremented by 1. Thereafter the comparison of the current value of U and Tcurrent is again made. Assuming that the value of U remains less than the value of Tcurrent, the loop through block 613 and 615 takes place anew.

Ultimately, the value of U grows to equal to value of Tcurrent. At that point, process control exits the loop and jumps to a block 617 where the number skipped over for the current position (just calculated in the loop controlled by operation 611) is added to the game arrangement number. Remember that the game arrangement number was originally set to 0 and then grows with each successive position.

From block 617, process control returns to iterative loop control 605 where the value of the position variable Q is incremented by 1. Then again, the current value of Q is compared with the value P. Assuming that the value of Q remains less than P, process control stays within the main loop and proceeds to block 607. Because a new symbol is likely considered at the next position Q, the value for the symbol Tcurrent must be updated. This is accomplished at block 607. In addition, the value of Tlow may have to be updated. This is typically the case with order-independent games, but not the case with order-dependent games.

After the new range of the variable U (between the potentially new values of Tlow and Tcurrent) is set, the number skipped over is reinitialized to 0 at block 609. From there, process control reenters the loop controlled by iterative loop control 611. Then again, the process iterates over successive values of U, but this time for the new position Q. At this new position Q, the WaysToPlace function is evaluated for each successive value of U within the range of Tlow to Tcurrent, and the values of the WaysToPlace function are summed to the value of the number skipped over. After the looping is completed, process control returns once again to block 617 where the game arrangement number is recomputed. From there, process control returns to iterative loop control 605.

Ultimately, at iterative loop control 605, the value of the position variable Q reaches the value P. At that point all possible positions have been considered. From there, the process returns the game arrangement number for the game arrangement under consideration. See block 619. The process is then complete.

Note that for order-independent games, the analysis of FIG. 6 is conducted with the assumption that each game arrangement in the sequence is ordered from the first position through the last position in ascending symbol order. Specifically, if the game is position independent (meaning only the symbols selected matter, not the position those symbols fall into), two games with the same symbols but in different positions are considered equivalent. In such cases, the process creates a rule stating that before a game arrangement is considered, all symbols are sorted (e.g. from least to greatest) and placed in positions according to their sorted order. The process executes this rule immediately before converting a game arrangement to a number. When a number is to be converted to a game arrangement, the resulting game arrangement will always be placed in that order (e.g., least value symbol to greatest value symbol).

FIG. 7 illustrates in more detail how a 5-card poker hand is converted to a number. As shown, the poker hand in question is dealt as a 3 of Hearts, a 7 of Clubs, a King of Hearts, an 8 of Diamond, and a 4 of Spades. This hand may have been dealt to the gaming machine, for example. In order to convert that hand into a unique number for autohold determination or other gaming operation, the following sequence is performed.

As shown, the process initially reorders the cards in ascending order of symbol. Thus, the hand is reordered as 3 of Hearts, King of Hearts, 8 of Diamonds, 7 of Clubs, and 4 of Spades.

Initially in the process, the number is set to value 0. The position variable Q is set equal to 0 as well. Tcurrent is set to the symbol value 3 of Hearts. There was no previous position to consider, so Tlow is set to 0 hence the value of U is also set to 0 for the first iteration. Note that U=0 corresponds to the 2 of Hearts.

Next, the process computes the number of WaysToPlace other cards when the first card is set to the 2 of Hearts. Because the game in question is order-independent poker, without replacement, the WaysToPlace function is given by choose (D−U−1, H−Q−1), where D is the deck size and H is the hand size. In this case, the deck size is 52 (for the 52 distinct cards/symbols in a deck) and H is 5 (meaning 5 cards in a hand). In this case, for the 2 of Hearts (U=0) and the first card (Q=0), the WaysToPlace is given by choose(51, 4) or 249,900.

Because there are no other symbols lower than 3 of Hearts except 2 of Hearts, the WaysToPlace value is equivalent to the number skipped over for position 1. Hence, the number for the game now represents 0+249,900, or just 249,900.

At this point, the number skipped over has been determined for position 0. So the process moves to position 1 (Q=1). At this position, the symbol is a King of Hearts. For position Q=1, the value of Tcurrent is a King of Hearts (symbol 11) and the value of Tlow is the 4 of Hearts (symbol 2). Because each of the game arrangements (poker hands) having a 2 of Hearts have been traversed and because the 3 of Hearts is fixed in position 0, the next possible card to consider is the 4 of Hearts. Therefore, Tlow is set to the 4 of Hearts. Beginning with U=2, the process computes the number of WaysToPlace the cards when position 0 contains 3 of Hearts and position 1 contains the 4 of Hearts. Again, the process logic employs the choose function for this purpose. In this case, U=2 and Q=1. The resulting value for the choose function is 18,424. This value is added to the previous number of skipped poker hands to yield the value of 268,324. Next, the process logic increments the value of U to 3 (the 5 of Hearts). The number of WaysToPlace the remaining poker cards with position 0 occupied by the 3 of Hearts and position 1 occupied by the 5 of Hearts is calculated to be 17,296. The process logic adds this value to the current number of game arrangements skipped to yield a value of 289,620. The process logic continues these operations (calculate WaysToPlace and accumulate) for the 6 of Hearts (U=4), the 7 of Hearts (U=5), the 8 of Hearts (U=6), the 9 of Hearts (U=7), the 10 of Hearts (U=8), the Jack of Hearts (U=9), and the Queen of Hearts (U=10). Using the WaysToPlace function, the process finds that the number of poker hands skipped over to reach the position immediately before 3 of Hearts, King of Hearts is 378,930. At this point, all game arrangements up to the arrangement 3 of Hearts, King of Hearts, Ace of Hearts, 2 of Diamonds, 3 of Diamonds have been traversed.

The process logic now moves to position 2 (Q=2). The logic sets the value of Tcurrent to the 8 of Diamonds and the value of Tlow to the Ace of Hearts. The process logic evaluates the WaysToPlace function for each card from the Ace of Hearts on up to the 7 of Diamonds. These values are accumulated to update the game number (number of game arrangements skipped over). The process is continued for Q=3 (7 of Clubs) and Q=4 (4 of Spades). At the end of the process, the resulting number of game arrangements skipped over gives the unique number corresponding to the game. In this case, that value is 383,649.

When symbol becomes the major order and position becomes the minor order, the above algorithm is revised by reversing the roles of symbol and position in FIG. 6. Instead of first iterating through positions 0-4, one would instead iterate through symbols 0-51 (for a 52 card poker deck), considering in the inner loop each position that the symbol could accept.

FIG. 8 presents a table of rules for various types of games. The table classifies the games into position-dependent versus position-independent and games allowing replacement versus games that do not allow replacement. The relevant rules include which WaysToPlace function to employ and which range of symbols to consider for a given position. Regarding the range of symbols to consider, a definition of Tlow is presented for each type of game.

The above discussion is focused primarily on order-independent poker without replacement. Keno is another example of such game. As indicated above, such games employ a choose function for their WaysToPlace function. And, at each position, these games increment the value of U from Tprevious+1 to Tcurrent−1, with Tprevious being the symbol placed previous position.

For order independent games with replacement (e.g. multiple deck poker) the conversion again employs a choose function as its WaysToPlace function. However, at each position the value of U increments from the value of Tprevious on up to Tcurrent−1. Because the game can produce hands having 2 positions occupied by the identical symbol, the value of U cannot exclude Tprevious. Therefore, unlike their "without replacement" counterparts, these games must include a Ways ToPlace calculation at the Tprevious symbol for each successive position.

Position-dependent games have many more possible game arrangements. Therefore, the number conversion algorithms employ WaysToPlace functions that return rather large numbers of game arrangements (larger than the corresponding choose functions). These functions are the permutation and exponential functions.

Considering first position dependent games with replacement allowed, the WaysToPlace function is an exponential because each successive position considered can have any symbol value. U must be evaluated all the way from symbol value 0 on up to symbol value Tcurrent−1. Examples of position-dependent, replacement allowed games include multiple deck poker (order dependent) and many slot games.

The last class of game considered in FIG. 8 is the position-dependent game without replacement. Position-dependent single deck poker is one example of such game. For such games, the conversion algorithm employs a permutation function as its WaysToPlace function. As with its replacement counterpart, this algorithm also increments U all the way from a value of U=0 on up to a value of U=Tcurrent−1. However, because replacement is not permitted, the algorithm excludes all symbols appearing in previous positions. Thus, considering the example presented with FIG. 7, the values of U considered at position 1 would range from 2 of Hearts up through Queen of Hearts while excluding the 3 of Hearts. The exclusion is necessary because the 3 of Hearts appears in position 0.

Note that some games may require a specially created WaysToPlace function. Such functions may take various forms such as a software-coded function, a look-up table, etc. See the checkers example below for an example of a software-coded function.

Conversion Algorithms (Number to Game)

Figure 9:
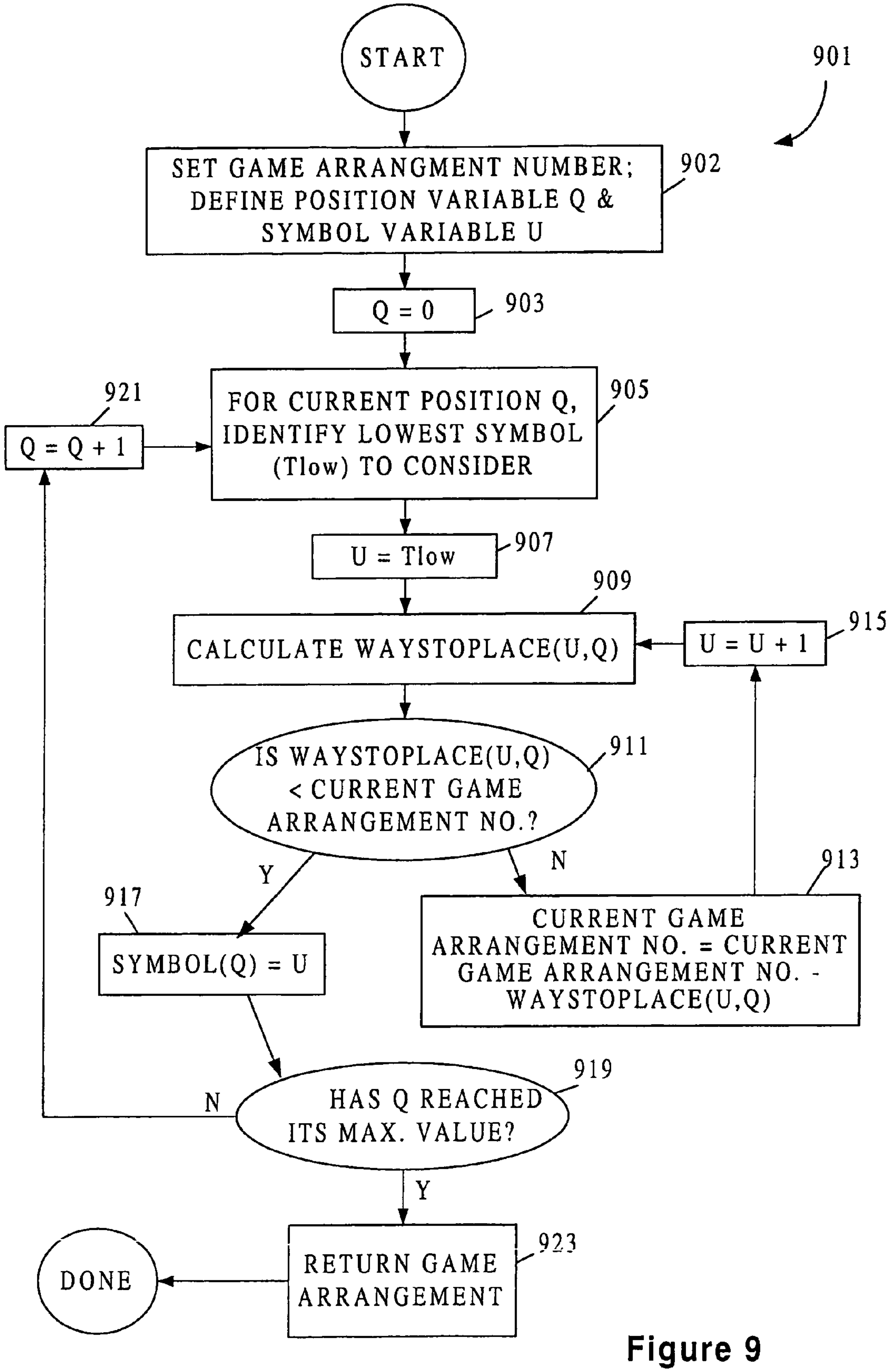
FIG. 9 is a process flow diagram depicting an exemplary algorithm for converting a game arrangement number to a corresponding symbolic representation of the game arrangement.

As mentioned, this invention also pertains to algorithms for converting a particular game arrangement number to the corresponding game arrangement symbol sequence. One suitable algorithm for this purpose is depicted as process 901 in FIG. 9. This process begins with a number to convert and a blank game arrangement—one with no symbols in any positions. In the algorithm, the process logic defines a position variable Q and a symbol variable U, having the same meanings as employed in the discussion of the algorithm of FIG. 6. See block 902.

The process considers each position Q in order, assuming that the position is the major order and symbol is the minor order. Thus, at block 903, the process logic initializes the value of Q to 0.

Then for the current position Q, the starting value of the symbol variable U must be set. At 905, the process logic identifies the lowest symbol (Tlow) to consider. The value of Tlow is chosen for the particular type of game under consideration. The chart shown in FIG. 8 provides a way to ascribe values of Tlow for various types of games.

At block 907, the value of U is set equal to Tlow. Thereafter, the process flow enters a loop in which successive values of U are considered and cause the value of the game arrangement number to decrease towards 0.

Thus, within the loop, the process logic calculates a Ways ToPlace function for the current values of U and Q. See block 909. Next, the algorithm compares the WaysToPlace value with the current game arrangement number. See 911. Note that initially, the current game arrangement number is merely the number to converted. As the algorithm proceeds, the current game arrangement number decreases towards 0.

If the process finds that the value of WaysToPlace(U,Q) is greater than the value of the current game arrangement number, then the loop is exited and further processing is performed as described below. Assuming for now that the value of WaysToPlace(U,Q) is not greater than the value of the current game arrangement number, process control moves to block 913 where the current game arrangement number is updated by subtracting the WaysToPlace value. Thereafter, the process logic increments the value of U by 1 as depicted at block 915. From there, process logic returns to block 909, where the algorithm calculates the WaysToPlace function anew, for the new value of U. And the algorithm again compares the WaysToPlace value with the current game arrangement number at decision 911, as described above. So long as the WaysToPlace value remains less than or equal to the current game arrangement number, the process logic continues looping through blocks 913, 915, and 909, each time reducing the value of the current game arrangement number.

Ultimately, a value of U will be reached in which the WaysToPlace value is greater than the current game arrangement number. At that point, the analysis at the current position is complete and the process logic leaves the loop.

From there, the algorithm sets the value of the symbol at position Q equal to the current value of U. See block 917. Thus, for example, considering the above example, the process logic would set the symbol value at the second position (Q=1) to the King of Hearts.

Next the process logic determines whether the current value of Q is the maximum value it can reach (i.e., the last position to be consider, such as Q=4 in five card poker). See decision 919. When the Q reaches its maximum value, the process is essentially complete. For now, assume that Q has not reached its maximum value. In that case, process control moves to block 921 where the position variable Q is incremented by 1. Then, process control returns to block 905, where the algorithm identifies the lowest symbol value (Tlow) to consider for the new position. The algorithm then initializes U to Tlow at block 907 as discussed above. From there, the process flow enters loop 909, 911, 913 and 915. While there, it marches along successive values of U and reduces the current game arrangement number, until the the WaysToPlace value is greater than the current game arrangement number. Then, the symbol value for position Q is set. Assuming that Q has not yet reached its maximum value, the process logic loops back to 921, where the position variable Q is again incremented by 1.

The above operations continue until Q has reached its maximum value and the current value of WaysToPlace(U,Q) is greater than the current game arrangement number. At that point, the process logic realizes that all symbol values have been fixed. At this point, the algorithm returns the game arrangement to other game processes at block 923. The process is then complete.

Gaming Machine Environment

Certain embodiments of the present invention employ processes acting or acting under control of data stored in or transferred through one or more computing machines or systems. Embodiments of the present invention also relate to an apparatus for performing these operations. This apparatus may be specially designed and/or constructed for the required purposes, or it may be a general-purpose computing machine selectively activated or reconfigured by program code and/or data structures stored in the computer. The processes presented herein are not inherently related to any particular computer or other apparatus.

In addition, embodiments of the present invention relate to computer readable media or computer program products that include program instructions and/or data (including data structures) for performing various computer-implemented operations such as those executing the conversion methods described above. Examples of computer-readable media include, but are not limited to, magnetic media such as hard disks, removable media (e.g. ZIP drives with ZIP disks, floppies or combinations thereof), and magnetic tape; optical media such as CD-ROM devices and holographic devices; magneto-optical media; semiconductor memory devices, and hardware devices that are specially configured to store and perform program instructions, such as read-only memory devices (ROM) and random access memory (RAM), and sometimes application-specific integrated circuits (ASICs), programmable logic devices (PLDs) and signal transmission media for delivering computer-readable instructions, such as local area networks, wide area networks, and the Internet. The data and program instructions of this invention may also be embodied on a carrier wave or other transport medium (e.g., optical lines, electrical lines, and/or airwaves). Examples of program instructions include both machine code, such as produced by a compiler, and files containing higher level code that may be executed by the computer using an interpreter.

Figure 10:
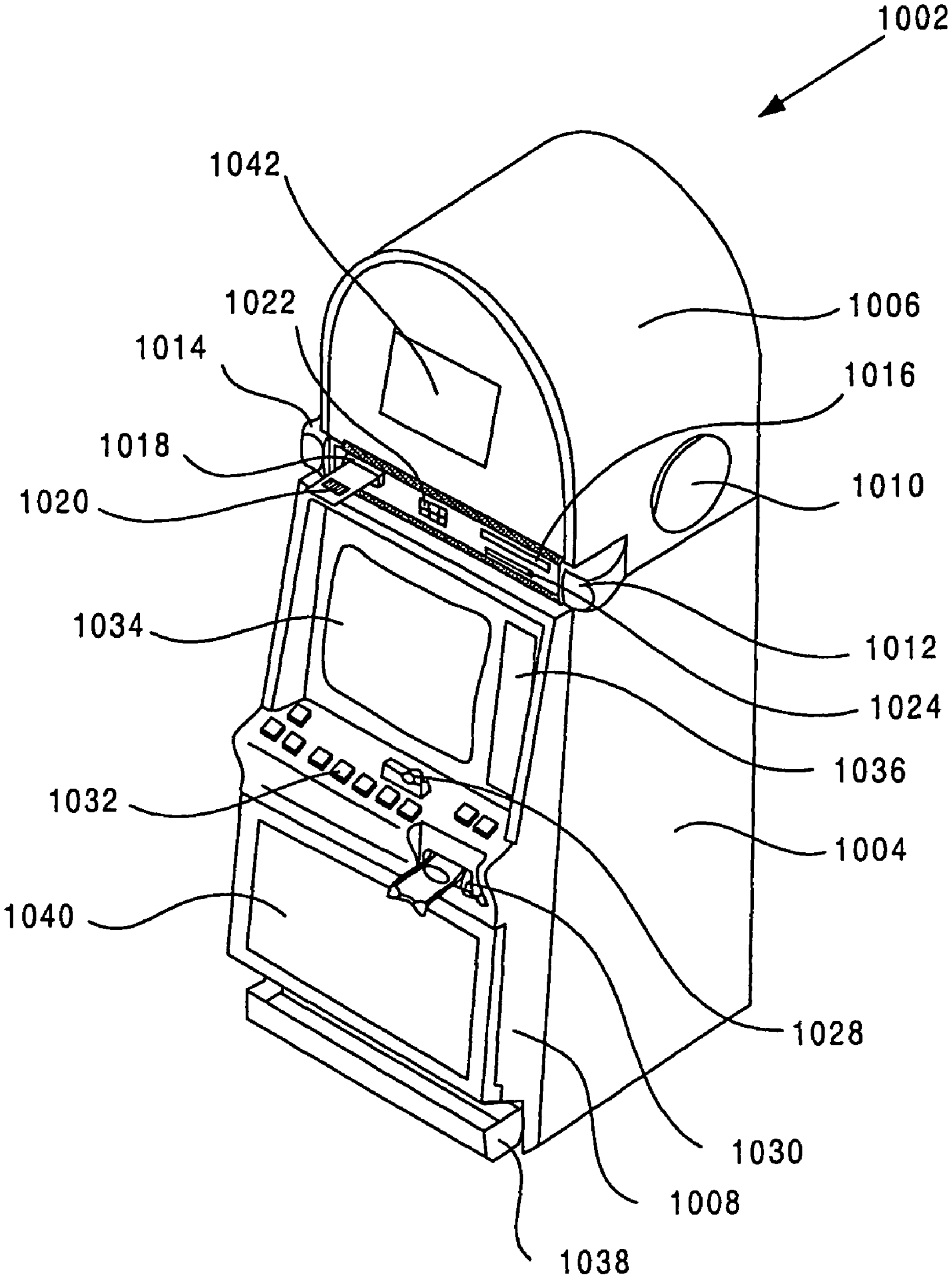
FIG. 10 is a perspective drawing of a gaming machine having a top box and other devices.

As suggested, this invention pertains in part to gaming machines that execute or possess logic for implementing any of the above-described algorithms, or portions thereof. In FIG. 10, a perspective drawing of video gaming machine 1002 of the present invention is shown. Machine 1002 includes a main cabinet 1004, which generally surrounds the machine interior (not shown) and is viewable by users. The main cabinet includes a main door 1008 on the front of the machine, which opens to provide access to the interior of the machine. Attached to the main door are player-input switches or buttons 1032, a coin acceptor 1028, and a bill validator 1030, a coin tray 1038, and a belly glass 1040. Viewable through the main door is a video display monitor 1034 and an information panel 1036. The display monitor 1034 will typically be a cathode ray tube, high resolution flat-panel LCD, or other suitable electronically controlled video monitor. The information panel 1036 may be a back-lit, silk screened glass panel with lettering to indicate general game information including, for example, the number of coins played. Many possible games, including traditional slot games, video slot games, video poker, and keno, may be provided with gaming machines of this invention.

The bill validator 1030, coin acceptor 1028, player-input switches 1032, video display monitor 1034, and information panel are devices used to play a game on the game machine 1002. The devices are controlled by circuitry (See FIG. 11) housed inside the main cabinet 1004 of the machine 1002. In the operation of these devices, critical information may be generated that is stored within a non-volatile memory storage device (See FIG. 11) located within the gaming machine 1002. For instance, when cash or credit of indicia is deposited into the gaming machine using the bill validator 1030 or the coin acceptor 1028, an amount of cash or credit deposited into the gaming machine 1002 may be stored within a non-volatile memory storage device. As another example, when important game information, such as the final positions of the slot reel symbols in a video slot game, is displayed on the video display monitor 1034, game history information needed to recreate the visual display of the slot reels may be stored in the non-volatile memory storage device. Preferably, in accordance with this invention, such game information is stored as unique numbers, rather than as representations of symbols. Generally, the type of information stored in the non-volatile memory may be dictated by the requirements of operators of the gaming machine and regulations dictating operational requirements for gaming machines in different gaming jurisdictions.

The depicted gaming machine 1002 includes a top box 1006, which sits on top of the main cabinet 1004. The top box 6 houses a number of devices, which may be used to add features to a game being played on the gaming machine 1002, including a secondary video display 1042, speakers 1010, 1012, 1014, a ticket printer 1018 which prints bar-coded tickets 1020, a key pad 1022 for entering player tracking information, a florescent display 1016 for displaying player tracking information and a card reader 1024 for entering a magnetic striped card containing player tracking information. Further, the top box 1006 may house different or additional devices beyond shown in the FIG. 10. For example, the top box may contain a bonus wheel or a back-lit silk screened panel which may be used to add bonus features to the game being played on the gaming machine. During a game, these devices are controlled and powered, in part, by the master gaming controller housed within the main cabinet 1004 of the machine 1002.

Understand that gaming machine 1002 is but one example from a wide range of gaming machine designs on which the present invention may be implemented. For example, not all suitable gaming machines have top boxes or player tracking features. Further, some gaming machines have only a single game display—mechanical or video, while others are designed for bar tables and have displays that face upwards.

As another example, a game may be generated in a host computer and may be displayed on a remote terminal or a remote gaming device. The remote gaming device may be connected to the host computer via a network of some type such as a local area network, a wide area network, an intranet or the Internet. The remote gaming device may be a portable gaming device such as but not limited to a cell phone, a personal digital assistant, and a wireless game player. Thus, those of skill in the art will understand that the present invention, as described below, can be deployed on most any gaming machine now available or hereafter developed.

Returning to the example of FIG. 10, when a user wishes to play the gaming machine 1002, he or she inserts cash through the coin acceptor 1028 or bill validator 1030. Additionally, the bill validator may accept a printed ticket voucher which may be accepted by the bill validator 1030 as an indicia of credit. During the game, the player typically views game information and game play using the video display 1034.

During the course of a game, a player may be required to make a number of decisions, which affect the outcome of the game. For example, a player may vary his or her wager on a particular game, select a prize for a particular game, or make game decisions that affect the outcome of a particular game. The player may make these choices using the player-input switches 1032, the video display screen 1034 or using some other device which enables a player to input information into the gaming machine. Certain player choices may be captured by player tracking software loaded in a memory inside of the gaming machine. For example, the rate at which a player plays a game or the amount a player bets on each game may be captured by the player tracking software. The player tracking software may utilize the non-volatile memory storage device to store this information.

Figure 11:
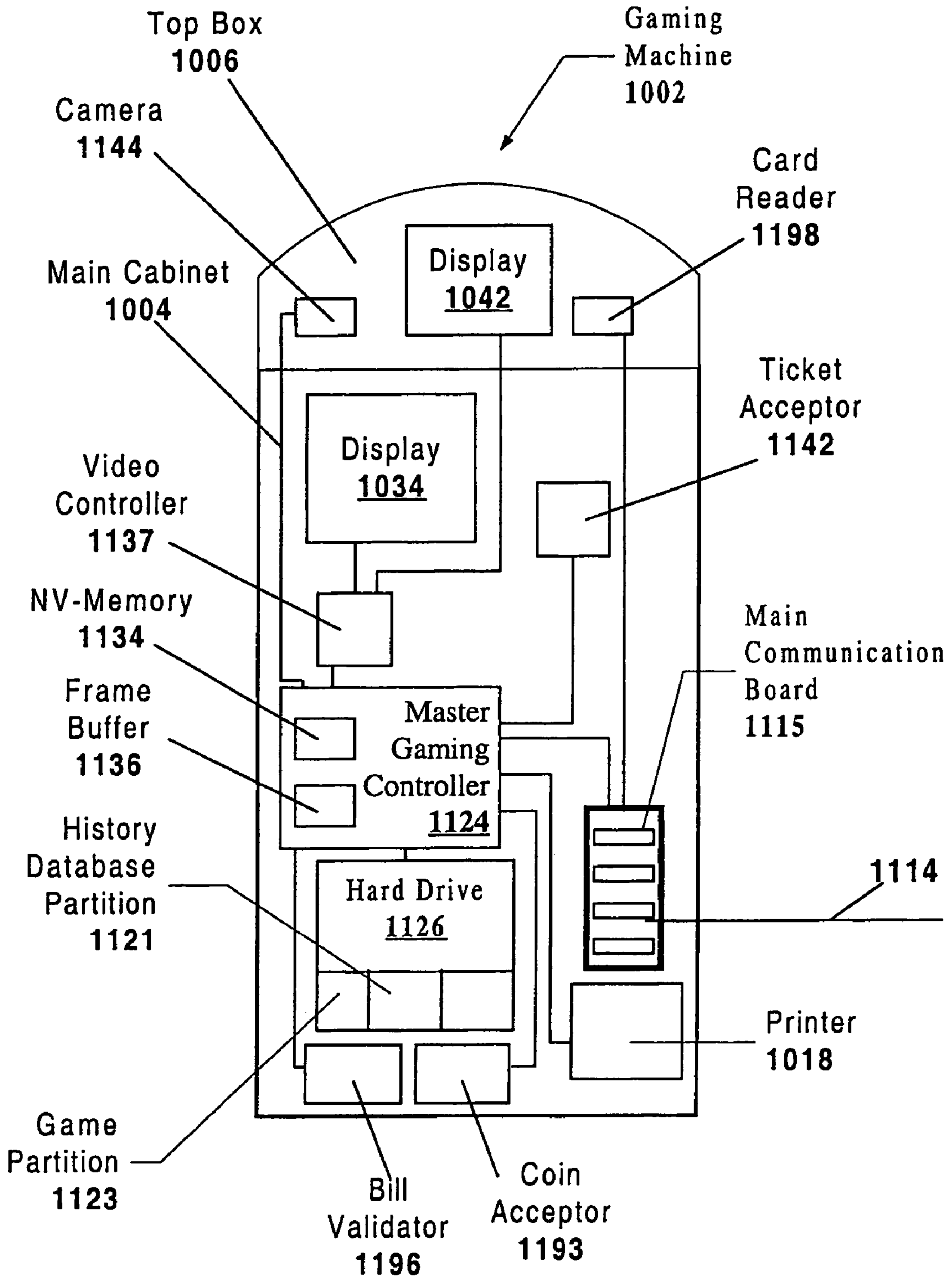
FIG. 11 is a block diagram of a gaming machine of the present invention.

FIG. 11 is a block diagram depicting logical components of gaming machine 1002, in accordance with an embodiment of the present invention. A master gaming controller 1124 controls the operation of the various gaming devices and the game presentation on the gaming machine 1002. The master gaming controller 1124 may communicate with other remote gaming devices such as remote servers via a main communication board 1113 and network connection 1114. The master gaming controller 1124 may also communicate other gaming devices via a wireless communication link (not shown). The wireless communication link may use a wireless communication standard such as but not limited to IEEE 802.11a, IEEE 802.11b, IEEE 802.11x (e.g. another IEEE 802.11 standard such as 802.11c or 802.11e), hyperlan/2, Bluetooth, and HomeRF.

Using a game code and/or libraries stored on the gaming machine 1002, the master gaming controller 1124 generates a game presentation which is presented on the displays 1034 and 1042. The game presentation is typically a sequence of frames updated at a rate of 75 Hz (75 frames/sec). For instance, for a video slot game, the game presentation may include a sequence of frames of slot reels with a number of symbols in different positions. When the sequence of frames is presented, the slot reels appear to be spinning to a player playing a game on the gaming machine. The final game presentation frames in the sequence of the game presentation frames are the final position of the reels. Based upon the final position of the reels on the video display 1034, a player is able to visually determine the outcome of the game.

Each frame in sequence of frames in a game presentation is temporarily stored in a video memory 1136 located on the master gaming controller 1124 or alternatively on the video controller 1137. The gaming machine 1002 may also include a video card (not shown) with a separate memory and processor for performing graphic functions on the gaming machine. Typically, the video memory 1136 includes 1 or more frame buffers that store frame data that is sent by the video controller 1137 to the display 1034 or the display 1042. The frame buffer is in video memory directly addressable by the video controller. The video memory and video controller may be incorporated into a video card, which is connected to the processor board containing the master gaming controller 1124. The frame buffer may consist of RAM, VRAM, SRAM, SDRAM, etc.

The frame data stored in the frame buffer provides pixel data (image data) specifying the pixels displayed on the display screen. The master gaming controller 1124, according to the game code, may generate each frame in one of the frame buffers by updating the graphical components of the previous frame stored in the buffer. The graphical component updates to one frame in the sequence of frames (e.g. a fresh card drawn in a video poker game) in the game presentation may be performed using various graphic libraries stored on the gaming machine.

Pre-recorded frames stored on the gaming machine may be displayed using video "streaming". In video streaming, a sequence of pre-recorded frames stored on the gaming machine is streamed through frame buffer on the video controller 1137 to one or more of the displays. For instance, a frame corresponding to a movie stored on the game partition 1123 of the hard drive 1126, on a CD-ROM or some other storage device may streamed to the displays 1034 and 1042 as part of game presentation. Thus, the game presentation may include frames graphically rendered in real-time using the graphics libraries stored on the gaming machine as well as pre-rendered frames stored on the gaming machine 1002.

For gaming machines, an important function is the ability to store and re-display historical game play information. The game history provided by the game history information assists in settling disputes concerning the results of game play. A dispute may occur, for instance, when a player believes an award for a game outcome has not properly credited to him by the gaming machine. The dispute may arise for a number of reasons including a malfunction of the gaming machine, a power outage causing the gaming machine to reinitialize itself and a misinterpretation of the game outcome by the player. In the case of a dispute, an attendant typically arrives at the gaming machine and places the gaming machine in a game history mode. In the game history mode, important game history information about the game in dispute can be retrieved from a non-volatile storage 1134 on the gaming machine and displayed in some manner to a display on the gaming machine. In some embodiments, game history information may also be stored to a history database partition 1121 on the hard drive 1126. The hard drive 1126 is only one example of a mass storage device that may used with the present invention. The game history information is used to reconcile the dispute.

During the game presentation, the master gaming controller 1124 may select and capture certain frames (or information about those frames) to provide a game history. These decisions are made in accordance with particular game code executed by controller 1124. Typically, one or more frames critical to the game presentation are captured. For instance, in a video slot game presentation, a game presentation frame displaying the final position of the reels is captured. In a video blackjack game, a frame corresponding to the initial cards of the player and dealer, frames corresponding to intermediate hands of the player and dealer and a frame corresponding to the final hands of the player and the dealer may be selected and captured as specified by the master gaming controller 1124. In some embodiments of this invention, only a single unique number representing a particular game arrangement associated with a frame need be stored.

EXAMPLES

The following examples illustrate how to implement the game to number invention for some basic game types. While some examples are given for the purpose of teaching this invention, it must be understood that this invention is not limited to the examples given. Any algorithm that follows procedures generally outlined above, may be considered to follow this invention.

For these examples, the following definitions apply:

Choose (X, Y)=X!/(Y!*(X−Y)!)

Perm (X, Y)=X!/(X−Y)!

Exp (X, Y)=X^Y

Also for these examples, the variable C is analogous to U and the variable P is analogous to Q.

Poker hands, single deck, order independent.

Since the order of the hand does not matter, a hand should be ordered according to card value to guarantee only one arrangement of cards selected. Once a symbol has been placed in a position, no symbol of lesser value may be placed in a subsequent position. Deck size, D=52 (53, if a joker is used). The cards (symbols) are valued 0 to D−1. Let the Hand size, H=5 (meaning, 5 cards in a hand). The function Ways ToPlace (Card C, Position P), where $0<=C_{previous}<C<D$ and $0<=P<H$ is evaluated as follows:

WaysToPlace (C, P)=Choose (D−C−1, H−P−1)

Alternatively, to convert a game to a number, ValueOfThe CurrentSymbol ( )=$\Sigma_{C_{previous}<C\leqq D+P-H}$ (WaysToPlace ( )) is evaluated as Choose (D−$C_{previous}$−1, H−P)−Choose (D−C, H−P), where $C_{previous}$ is the card placed in position P−1 ($C_{previous}$=−1 for P=0). Note that the upper bound on the summation value of C (D+P−H) limits the maximum symbol value for a given position. For example, in position 0, the maximum value of C is 47 (or the 10 of Spades). This forces the hand to be 10S, JS, QS, KS, and AS. Note also that this involves implementing one function for converting a game to a number and another function for converting a number to a game.

Poker Hand, Single Deck, Order Dependent

Since the order matters, two hands with the same cards, but in a different order, are considered to be different hands. Deck size, D=52 (53, if a joker is used). The cards (symbols) are valued 0 to D−1. Let the Hand size, H=5 (meaning 5 cards in a hand). The function WaysToPlace (Position P), where $0<=C<D$ and $0<=P<H$ is evaluated as follows:

WaysToPlace(P)=Perm(D−P−1, H−P−1)

Alternatively, to convert a game to a number, ValueOfThe CurrentSymbol ( )=$\Sigma_{0<=C<D}$ (WaysToPlace ( )) is evaluated as $C_{unused}$*Perm(D−P−1, H−P−1), where $C_{unused}$ is the number of cards less than C that have not been used in the hand. This is not the preferred embodiment, as it involves implementing one function for converting a game to a number and another function for converting a number to a game.

Poker Hand, Multiple Deck, Order Independent

This example is only valid where the number of decks used is equal to or greater than the number of cards in a hand. If this condition is not true, a more complex function must be derived or coded. Since the order of the hand doesn't matter, a hand should be ordered according to card value to guarantee only one arrangement of cards selected. Once a symbol has been placed in a position, no symbol of lesser value may be placed in a subsequent position, but a symbol of equal value may be. Deck size, D=52 (53, if a joker is used). The cards (symbols) are valued 0 to D−1. Let the Hand size, H=5 (meaning, 5 cards in a hand). The function WaysToPlace (Card C, Position P), where $0<=C<D$ and $0<=P<H$ is evaluated as follows:

WaysToPlace (C, P)=Choose (D+H−C−P−2, H−P−1)

Alternatively, to convert a game to a number, ValueOfThe CurrentSymbol ( )=$\Sigma_{C_{previous}<=U<D}$ (WaysToPlace ( )) is evaluated as Choose (D+H−P−$C_{previous}$−1, H−P). In this case, U is the symbol variable, as used in FIG. 6. Note that this is not necessarily the preferred embodiment, as it involves implementing one function for converting a game to a number and another function for converting a number to a game.

Poker Hand, Multiple Deck, Order Dependent

This example is only valid where the number of decks used is equal to or greater than the number of cards in a hand. If this condition is not true, a more complex function must be derived or coded. Since the order matters, two hands with the same cards, but in a different order, are considered to be different hands. Deck size, D=52 (53, if a joker is used). The cards (symbols) are valued 0 to D−1. Let the Hand size, H=5 (meaning, 5 cards in a hand). The function WaysToPlace (Position P), where 0<=C<D and 0<=P<H is evaluated as follows:

WaysToPlace (P)=Exp (D, H−1−P)

Alternatively, to convert a game to a number, ValueOfTheCurrentSymbol ( )=$\Sigma_{0<=C<D}$ WaysToPlace ( ) is evaluated as (C−1)*Exp (D, H−1−P). This is not the preferred embodiment, as it involves implementing one function for converting a game to a number and another function for converting a number to a game.

Keno

Since the order of the spots drawn does not matter, the spots should be ordered numerically to guarantee only one arrangement of spots selected. Once a spot has been selected, no spot of lesser value may be selected in a subsequent position. Keno Card size, K=80. The spots, S, are valued 0 to K−1. Balls drawn, B=20. Current ball drawn, C, is valued 0 to B−1.

WaysToPlace (Spot S, Ball B), where 0<=S<K and 0<=C<B is evaluated as follows:

WaysToPlace (S, B)=Choose (K−S−1, B−C−1)

Alternatively, to convert a game to a number, ValueOfTheCurrentSymbol ( )=$\Sigma_{S_{previous}<=S<K}$ WaysToPlace ( ) is evaluated as Choose (K−$S_{previous}$−1, B−C)−C(K−S, B−C). This embodiment involves implementing one function for converting a game to a number and another function for converting a number to a game.

Slot, Identical Symbol Sets on Each Reel

Given S symbols and R reels, let the Reel be the major order and the symbol be the minor order. For each Symbol U, WaysToPlace (Reel Q) is evaluated as follows:

WaysToPlace (Q)=Exp (S, R−Q−1)

Alternatively, to convert a game to a number, ValueOfTheCurrentSymbol ( )=$\Sigma_{0<=U<S}$ WaysToPlace ( ) is evaluated as (U−1)*Exp (S, R−Q−1). This is not the preferred embodiment, as it involves implementing one function for converting a game to a number and another function for converting a number to a game.

Slot, Unique Symbol Sets on Each Reel

Given R reels and $S_Q$ symbols on reel Q, let the Reel be the major order and the symbol be the minor order. For each Symbol U, WaysToPlace (Reel Q) is evaluated as follows:

WaysToPlace (Q)=$S_{Q+1}$*$S_{q+2}$* . . . *$S_{R-2}$*$S_{R-1}$*$S_R$

Alternatively, to convert a game to a number, ValueOfTheCurrentSymbol ( )=$\Sigma_{0<=U<Sq}$ WaysToPlace ( ) is evaluated as (U−1)*$S_{Q+1}$*$S_{q+2}$* . . . *$S_{R-2}$*$S_{R-1}$*$S_R$. This embodiment involves implementing one function for converting a game to a number and another function for converting a number to a game.

Checkers

Checkers is included as an example that requires a software-coded function. Every possible checkers board representative of a game in progress may be converted to a number, given the following rules.

Each player may have up to 12 pieces and any piece may be a normal piece or a King. As shown, the WaysToPlace function here involves a sum of two combinatorial and two exponential functions. It determines how many ways to fill the board with remaining pieces. This determination depends upon how many red pieces are currently placed, how many black pieces are currently placed, and the color of the current piece under consideration. Obviously, if there are 12 black pieces on the board, there are zero ways to place an additional black piece. Note that within the evaluation function, there are separate loops from 0 over the number of pieces left for red pieces and black pieces.

Let the position on the board be the major order and the pieces be the minor order. The evaluation function is as follows:

```
// Maximum values, dictated by the rules of checkers
const uint8 MAX_POSITIONS = 32;
const uint8 MAX_RED_PIECES = 12;
const uint8 MAX_BLACK_PIECES = 12;
// Value of pieces
const uint8 PIECE_NONE = 0;
const uint8 PIECE_RED_NORMAL = 1;
const uint8 PIECE_RED KING = 2;
const uint8 PIECE_BLACK_NORMAL = 3;
const uint8 PIECE_BLACK_KING = 4;
uint64 WaysToPlace (uint8 red_pieces_placed,
                    uint8 black_pieces_placed,
                    uint8 current_piece_to_place,
                    uint8 current_position)
{
   uint64 ways = 0;
   // Treat the current position as if its already filled
   uint8 positions_left = MAX_POSITIONS − current_position − 1;
   // Treat the current piece as if it is already placed
   switch (current_piece_to_place)
   {
   case PIECE_RED_NORMAL:
   case PIECE_RED_KING:
         ++red_pieces_placed;
         break;
   case PIECE_BLACK_NORMAL:
   case PIECE_BLACK_KING:
         ++black_pieces_placed;
         break;
         case PIECE_NONE:
   default:
         break;
   }
   // Count the number of ways to fill the rest of the board
   for (uint8 red_pieces_added = 0;
            (red_pieces_added <= positions_left)
            && (red_pieces_added + red_pieces_placed <=
            MAX_RED_PIECES);
            ++red_pieces_added)
   for (uint8 black_pieces_added = 0;
            (black_pieces_added <= positions_left −
            red_pieces_added)
            && (black_pieces_added + black_pieces_placed <=
MAX_BLACK_PIECES);
            ++black_pieces_added)
   {
      // Ways to place the red pieces
      uint64 ways_added = choose (positions_left,
      red_pieces_added);
      // Ways to let red pieces be either normal or king
      ways_added *= (1 << red_pieces_added);
      // Ways to place the black pieces
      ways_added *= choose (positions_left − red_pieces_added,
            black_pieces_added);
      // Ways to let black pieces be either normal or king
      ways_added *= (1 << black_pieces_added);
      // Add to the total count
      ways += ways_added;
   }
   return ways;
}
```

In the above software-coded function, position is the major order and symbol is the minor order. As shown, the value of MAX_POSITIONS is set to 32. Considering the algorithm depicted in FIG. 6, this means that block 605 iterates on positions 0-31. The checkers software implementor must define a mapping of 0-31 to positions on the checkers board.

The "value of pieces" section of the above code defines five different possible symbol values for each position on the board. Considering the FIG. 6 algorithm, this means that block 611 iterates on symbols in the order shown; i.e., NONE, RED_NORMAL, RED_KING, BLACK_NORMAL, and BLACK_KING. Thus, each position has one of the symbols. In any given game arrangement, there can be 0 to 12 red pieces and 0 to 12 black pieces. And each of these pieces can be normal or king.

Other Embodiments

Although the foregoing invention has been described in some detail for purposes of clarity of understanding, it will be apparent that certain changes and modifications may be practiced within the scope of the appended claims. For instance, while the algorithms of this invention have been depicted using particular WaysToPlace functions for calculating the number of arrangements skipped over at any given position, the use of gaming algorithms in accordance with this invention is not so limited. For example, the algorithm may be provided with other mechanisms including counting mechanisms for assessing number of arrangements skipped for a given position.

What is claimed is:

1. A method, comprising:

receiving, by a logic device, a first symbolic representation of a position-dependent game arrangement;

determining, by the logic device, whether a symbol can appear more than once in the game arrangement;

determining, by the logic device, a first numeric representation of the game arrangement based on the following:

symbol positions and values of the game arrangement; and for each symbol value set at a given position, a number of sequentially arranged symbolic representations of game arrangements passed over to reach a game arrangement that includes the symbol value set at the given position, wherein the number of sequentially arranged symbolic representations of game arrangements that are passed over is calculated with a permutation function when a symbol cannot appear more than once in the game arrangement, and wherein the number of sequentially arranged symbolic representations of game arrangements that are passed over is calculated with an exponential function when a symbol can appear more than once in the game arrangement; and storing the first numeric representation of the game arrangement.

2. The method of claim 1, wherein the determining includes:

(a) setting the given position to the specific symbol value;

(b) calculating, based on the specific symbol value, the number of sequentially arranged symbolic representations of game arrangements passed over to reach a game arrangement that includes the specific symbol value set at the given position;

repeating steps (a) and (b) for each position in the first symbolic representation of the game arrangement; and calculating the first numeric representation of the game arrangement by summing each of the number of sequentially arranged symbolic representations of game arrangements passed over to reach a game arrangement that includes the specific symbol value set at the given position calculated in each repeating step.

3. The method of claim 1, wherein the symbols associated with the game comprise playing card symbols.

4. A method of determining a symbolic representation of a game arrangement from a numeric representation of the game arrangement, the game arrangement specified by a combination of positions and symbols associated with a game, the method comprising:

receiving, by a computing machine, a first numeric representation of the game arrangement, the game arrangement being position-dependent;

determining, by the computing machine, whether a symbol can appear more than once in the game arrangement;

determining, by the computing machine, using the first numeric representation of the game arrangement, a first symbolic representation of the game arrangement by:

(a) setting a given position or given symbol to a specific position value or specific symbol value;

(b) determining a number of possible placements of remaining positions or symbols in remaining positions or symbols when the given position or given symbol is set to the specific position value or specific symbol value, wherein the number of possible placements of remaining positions or symbols in remaining positions or symbols is calculated with a permutation function when a symbol cannot appear more than once in the game arrangement, and wherein the number of possible placements of remaining positions or symbols in remaining positions or symbols is calculated with an exponential function when a symbol can appear more than once in the game arrangement;

(c) comparing the first numeric representation of the game with the determined number of possible placements;

(d) determining, based on the comparison, whether the first symbolic representation of the game arrangement includes the specific position value or specific symbol value; and (e) labeling the given position or given symbol with the specific position value or specific symbol value if the specific position value or specific symbol value appears in the first symbolic representation of the game arrangement; and displaying the first symbolic representation of the game arrangement on a display device during game play on a gaming machine.

5. The method of claim 4, further comprising:

determining, after said comparing the first numeric representation of the game with the determined number of possible placements, that the specific position value or specific symbol value of the given position or given symbol does not appear in the first symbolic representation of the game arrangement;

incrementing the specific position value or specific symbol value; and performing (a)-(d) on the incremented specific position value or specific symbol value.

6. The method of claim 5, further comprising:

repeating (a)-(d), with each incremented specific position value or specific symbol value, until determining that the specific position value or specific symbol value of the given position or given symbol does appear in the first symbolic representation of the game arrangement;

selecting a second given position or given symbol; and performing (a)-(d) for the second given position or given symbol.

7. The method of claim 4, further comprising: subtracting the calculated number of possible placements from a current game arrangement number that is either (i) the first numerical representation of the game arrangement or (ii) a number that has been derived from the first numerical representation of the game arrangement.

8. The method of claim 4, wherein the game is a poker game, a slot game, keno, or checkers.

9. The method of claim 4, further comprising: displaying the symbolic representation of the game arrangement on the gaming machine.

10. The method of claim 4, further comprising: retrieving the first numeric representation of the game arrangement from a storage location on the computing machine.

11. The method of claim 4, further comprising: retrieving the first numeric representation of the game arrangement from a stored list or table of game arrangements when a player initiates a game on the gaming machine.

12. A computing device, comprising:

means for receiving a first numeric representation of a position-dependent game arrangement;

means for determining whether a symbol can appear more than once in the game arrangement; and means for performing the following operations:

setting a given position or given symbol to a specific position value or specific symbol value;

determining a number of possible placements of remaining positions or symbols in remaining positions or symbols when the given position or given symbol is set to the specific position value or specific symbol value, wherein the number of possible placements of remaining positions or symbols in remaining positions or symbols is calculated with a permutation function when a symbol cannot appear more than once in the game arrangement, and wherein the number of possible placements of remaining positions or symbols in remaining positions or symbols is calculated with an exponential function when a symbol can appear more than once in the game arrangement;

comparing the first numeric representation of the game with the determined number of possible placements;

determining, based on the comparison, whether the first symbolic representation of the game arrangement includes the specific position value or specific symbol value; and labeling the given position or given symbol with the specific position value or specific symbol value if the specific position value or specific symbol value appears in the first symbolic representation of the game arrangement.

13. The computing device of claim 12, wherein the computing device comprises a server.

14. The computing device of claim 12, wherein the computing device comprises a gaming machine.

15. A computing device configured to determine a symbolic representation of a game arrangement from a numeric representation of a game arrangement, a game arrangement specified by a combination of positions and symbols associated with a game, the computing device comprising:

a logic device configured to do the following:

(a) receive a first numeric representation of a game arrangement, the game arrangement being position-dependent;

(b) determine whether a symbol can appear more than once in the game arrangement;

(c) set a given position or given symbol to a specific position value or specific symbol value;

(d) determine a number of possible placements of remaining positions or symbols in remaining positions or symbols when the given position or given symbol is set to the specific position value or symbol value, wherein the number of possible placements of remaining positions or symbols in remaining positions or symbols is calculated with a permutation function when a symbol cannot appear more than once in the game arrangement, and wherein the number of possible placements of remaining positions or symbols in remaining positions or symbols is calculated with an exponential function when a symbol can appear more than once in the game arrangement;

(e) compare the first numeric representation of the game with the determined number of possible placements;

(f) determine, based on the comparison, whether the first symbolic representation of the game arrangement includes the specific position value or specific symbol value; and (g) label the given position or given symbol with the specific position value or symbol value if the specific position value or symbol value appears in the first symbolic representation of the game arrangement.

16. The computing device of claim 15, wherein the logic device is further configured to:

determine, after the logic device compares the first numeric representation of the game with the determined number of possible placements, that the specific position value or specific symbol value of the given position or given symbol does not appear in the first symbolic representation of the game arrangement;

increment the specific position value or specific symbol value; and perform (c)-(f) on the incremented specific position value or specific symbol value.

17. The computing device of claim 15, wherein the logic device is further configured to:

repeat (c)-(f), with each incremented specific position value or specific symbol value, until determining that the specific position value or specific symbol value of the given position or given symbol does appear in the first symbolic representation of the game arrangement;

select a second given position or given symbol; and perform (c)-(f) for the second given position or given symbol.

18. The computing device of claim 15, wherein the logic device is further configured to subtract the calculated number of possible placements from a current game arrangement number that is either (i) the first numerical representation of the game arrangement or (ii) a number that has been derived from the first numerical representation of the game arrangement.

19. The computing device of claim 15, wherein the computing device comprises a server.

20. The computing device claim 19, wherein the server comprises a memory that contains a stored list or table of possible numeric representations of game arrangements that is used to retrieve the first numeric representation of the game arrangement.

21. The computing device of claim 15, wherein the computing device comprises a gaming machine.

22. The computing device of claim 21, wherein the game is a poker game, a slot game, keno, or checkers.

23. The computing device of claim 21, wherein the gaming machine comprises a display configured to display the first symbolic representation of the game arrangement.

24. A method, comprising:

receiving, by a computing machine, a first symbolic representation of a position-dependent game arrangement;

determining, by the computing machine, whether a symbol can appear more than once in the game arrangement;

determining, by the computing machine, using the first symbolic representation of the game arrangement, a first numeric representation of the game arrangement by:

(a) setting a given position or given symbol to a specific position value or specific symbol value;

(b) determining a number of sequentially arranged symbolic representations of game arrangements skipped over to reach a game arrangement that includes the specific position value or specific symbol value set at the given position or given symbol, wherein the number of sequentially arranged symbolic representations of game arrangements that are skipped over is calculated with a permutation function when a symbol cannot appear more than once in the game arrangement, and wherein the number of sequentially arranged symbolic representations of game arrangements that are skipped over is calculated with an exponential function when a symbol can appear more than once in the game arrangement; and (c) determining a new game number, wherein the new game number is the number of sequentially arranged symbolic representations of game arrangements skipped over;

repeating steps (a), (b), and (c) for each given position or given symbol in the first symbolic representation of the game arrangement;

determining the first numeric representation of the game arrangement by summing each of the new game numbers determined in each repeating step; and storing the first numeric representation of the game arrangement.

25. The method of claim 24, wherein (b) further comprises:

for a series of position values or symbol values less than the specific position value or specific symbol value, calculating a number of sequentially arranged symbolic representations of game arrangements available beyond the given position or given symbol and summing the calculated number of sequentially arranged symbolic representations to give the number of sequentially arranged symbolic representations of game arrangements skipped over.

26. The method of claim 24, further comprising:

using the first numeric representation of the game arrangement during a wager-based game to determine which cards to hold in a poker hand.

27. The method of claim 24, wherein storing the first numeric representation of the game arrangement comprises storing the first numeric representation of the game arrangement in a game history memory location.

28. The method of claim 24, wherein the game is a poker game, a slot game, keno, or checkers.

29. The method of claim 24, wherein the number of sequentially arranged symbolic representations of game arrangements that is skipped over is determined with a software-coded function or look-up table.

30. A computing device configured to determine a numeric representation of a game arrangement from a symbolic representation of a game arrangement, a game arrangement specified by a combination of positions and symbols associated with a game, the computing device comprising:

a logic device configured to receive a first symbolic representation of a position-dependent game arrangement and to determine whether a symbol can appear more than once in the game arrangement, the logic device being further configured to perform the following operations:

(a) set a given position or given symbol to a specific position value or specific symbol value;

(b) determine a number of sequentially arranged symbolic representations of game arrangements skipped over to reach a game arrangement that includes the specific position value or specific symbol value set at the given position or given symbol, wherein the number of sequentially arranged symbolic representations of game arrangements that are skipped over is calculated with a permutation function when a symbol cannot appear more than once in the game arrangement, and wherein the number of sequentially arranged symbolic representations of game arrangements that are skipped over is calculated with an exponential function when a symbol can appear more than once in the game arrangement;

(c) determine a new game number, wherein the new game number is the number of sequentially arranged symbolic representations of game arrangements skipped over;

repeat (a), (b), and (c) for each given position or given symbol available in the first symbolic representation of the game arrangement;

determine the first numeric representation of the game arrangement by summing each of the new game numbers determined in each repeating step; and store the numeric representation of the game arrangement.

31. The computing device of claim 30, wherein (b) further comprises:

for a series of position values or symbol values less than the specific position value or specific symbol value, calculating a number of sequentially arranged symbolic representations of game arrangements available beyond the given position or given symbol and summing the calculated number of sequentially arranged symbolic representations to give the number of sequentially arranged symbolic representations of game arrangements skipped over.

32. The computing device of claim 30, wherein the logic device is further configured to use the first numeric representation of the game arrangement during a wager-based game to determine which cards to hold in a poker hand.

33. The computing device of claim 30, wherein the computing device comprises a server.

34. The computing device of claim 30, wherein the computing device comprises a gaming machine.

* * * * *